United States Patent
He et al.

(10) Patent No.: US 11,736,675 B2
(45) Date of Patent: Aug. 22, 2023

(54) VIEWPOINT METADATA FOR OMNIDIRECTIONAL VIDEO

(71) Applicant: InterDigital Madison Patent Holdings, SAS, Paris (FR)

(72) Inventors: Yong He, San Diego, CA (US); Yan Ye, San Diego, CA (US); Ahmed Hamza, Montreal (CA)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/045,104

(22) PCT Filed: Apr. 4, 2019

(86) PCT No.: PCT/US2019/025784
§ 371 (c)(1),
(2) Date: Oct. 2, 2020

(87) PCT Pub. No.: WO2019/195547
PCT Pub. Date: Oct. 10, 2019

(65) Prior Publication Data
US 2021/0152808 A1 May 20, 2021

Related U.S. Application Data

(60) Provisional application No. 62/675,524, filed on May 23, 2018, provisional application No. 62/653,363, filed on Apr. 5, 2018.

(51) Int. Cl.
*H04N 13/178* (2018.01)
*H04N 13/183* (2018.01)
(52) U.S. Cl.
CPC ......... *H04N 13/178* (2018.05); *H04N 13/183* (2018.05)

(58) Field of Classification Search
CPC .... H04N 13/178; H04N 13/183; H04N 21/84; H04N 21/21805; H04N 21/2353; H04N 21/816; H04N 21/8456; H04N 13/117
(Continued)

(56) References Cited

U.S. PATENT DOCUMENTS 11,093,752 B2 * 8/2021 Kim .................. G06V 20/41
2001/0056396 A1 * 12/2001 Goino ................ G06Q 30/0601
705/37
(Continued)

FOREIGN PATENT DOCUMENTS

CN 102246491 A 11/2011
JP 2017184114 A 10/2017
(Continued)

OTHER PUBLICATIONS

Koenen, R., et al, "Requirements MPEG-I phase 1b" International Organisation for Standardisation Organisation Internationale De Normalisation ISO/IEC JTC1/SC29/WG11 Coding of Moving Pictures and Audio Jan. 2018 (8 pages).
(Continued)

*Primary Examiner* — Tung T Vo
(74) *Attorney, Agent, or Firm* — Smadar Gefen

(57) ABSTRACT

Methods are described herein for signaling information regarding different viewpoints in a multi-viewpoint omnidirectional media presentation. In some embodiments, a container file (which may use the ISO Base Media File Format) is generated containing several tracks. The tracks are grouped using a track-group identifier, where each track-group identifier is associated with a different viewpoint. In some embodiments, a manifest (such as an MPEG-DASFI MPD) is generated, where the manifest includes viewpoint identifiers that identify the viewpoint associated with each stream. In some embodiments, metadata included
(Continued)

in a container file and/or in a manifest provides information on the position of each viewpoint, the intervals during which each viewpoint is available, transition effects for transitions between viewpoints, and/or recommended projection formats for corresponding field-of-view ranges.

21 Claims, 9 Drawing Sheets

(58) Field of Classification Search
USPC .......................................................... 348/39
See application file for complete search history.

(56) References Cited

U.S. PATENT DOCUMENTS

| | | | | |
|---|---|---|---|---|
| 2008/0049123 | A1* | 2/2008 | Gloudemans | H04N 5/247 348/E5.022 |
| 2010/0259595 | A1* | 10/2010 | Trimeche | H04N 21/2365 348/E13.001 |
| 2011/0161875 | A1* | 6/2011 | Kankainen | G06F 3/0481 715/810 |
| 2011/0261050 | A1* | 10/2011 | Smolic | G06T 15/20 345/419 |
| 2014/0002439 | A1* | 1/2014 | Lynch | G06T 3/4053 345/419 |
| 2014/0043340 | A1* | 2/2014 | Sobhy | G06F 16/29 345/473 |
| 2017/0347026 | A1* | 11/2017 | Hannuksela | H04N 21/26258 |
| 2018/0063505 | A1 | 3/2018 | Lee | |
| 2018/0143756 | A1* | 5/2018 | Mildrew | G06T 19/003 |
| 2018/0247463 | A1* | 8/2018 | Rekimoto | H04N 5/262 |
| 2019/0075269 | A1* | 3/2019 | Nashida | H04N 21/41 |
| 2019/0102940 | A1* | 4/2019 | Nakao | H04N 5/272 |
| 2019/0104316 | A1* | 4/2019 | Da Silva Pratas Gabriel | H04N 19/167 |
| 2019/0141359 | A1* | 5/2019 | Taquet | H04N 21/21805 |
| 2019/0246146 | A1* | 8/2019 | Bustamante | H04N 21/242 |
| 2019/0287302 | A1* | 9/2019 | Bhuruth | H04N 21/854 |
| 2019/0306530 | A1* | 10/2019 | Fan | H04N 21/2362 |
| 2019/0313081 | A1* | 10/2019 | Oh | H04N 13/178 |
| 2019/0327425 | A1* | 10/2019 | Kobayashi | H04N 21/44016 |
| 2019/0387271 | A1* | 12/2019 | Ojiro | H04N 21/26258 |

FOREIGN PATENT DOCUMENTS

| | | |
|---|---|---|
| WO | WO2017159063 A1 | 9/2017 |
| WO | 2018027067 A1 | 2/2018 |

OTHER PUBLICATIONS

Fehn, Christoph. "Depth-Image-Based Rendering (DIBR), Compression, And Transmission For A New Approach on 3D-TV". Stereoscopic Displays and Virtual Reality Systems XI, International Society for Optics and Photonics, vol. 5291, (2004) pp. 93-104 (12 pages).

Domański, M. et al., "Extended VSRS for 360 degree video," ISO/IEC JTC1/SC29 WG11 Doc. MPEG M41990, Gwangju, Jan. 2018 (5 pages).

"Revised text of ISO/IEC FDIS 23090-2 Omnidirectional Media Format", 121.MPEG Meting ;Jan. 22, 2018-Jan. 26, 2018; Gwangju; (Motion Picture Expert Group or ISO/IEC JTC1/SC29/WG11), No. N17399, Feb. 28, 2018, XP030024044.

International Search Report and Written Opinion of the International Searching Authority for PCT/US2019/025784 dated Jun. 6, 2019, 12 pages.

International Standard, "Information technology—Coded representation of immersive media (MPEG-I)—Part 2: Omnidirectional Media Format". ISO/IEC JTC 1/SC 29/WG11, ISO/IEC FDIS 23090-2, Feb. 7, 2018, 182 pages.

Lee, Jangwon, et. al., "Comment on Timed Metadata Signaling for DASH in OMAF DIS". LG Electronics, International Organization for Standardization, Coding of Moving Pictures and Audio, Motion Picture Expert Group (MPEG), ISO/IEC JTC1/SC29/WG11, No. M40798, Jul. 2017, 3 pages.

Written Opinion of the International Preliminary Examining Authority for PCT/US2019/025784 dated Mar. 12, 2020, 7 pages.

International Preliminary Report on Patentability for PCT/US2019/025784 completed on Jun. 26, 2020, 10 pages.

International Organization for Standardization, "Information technology—Coding of audio-Visual Objects—Part 12: ISO Base Media File Format; Amendment 1: General Improvements Including Hint Tracks, Metadata Support And Sample Groups". ISO/IEC, 14496-12, (2009), 11 pages.

International Organization for Standardization, "Information Technology—Dynamic Adaptive Streaming Over HTTP (DASH), Part 1: Media Presentation Description and Segment Formats". International Standard, ISO/IEC 23009-1, Second Edition, May 15, 2014, 152 pages.

Rosenthal, Paul, et. al., "Image-Space Point Cloud Rendering". Proceedings of Computer Graphics International, (2008) pp. 1-8.

* cited by examiner

VIEWPOINT METADATA FOR OMNIDIRECTIONAL VIDEO

CROSS-REFERENCE TO RELATED APPLICATIONS

The present application is national stage application under 35 U.S.C. 371 of International Application No. PCT/US2019/025784, entitled "VIEWPOINT METADATA FOR OMNIDIRECTIONAL VIDEO", filed on Apr. 4, 2019, which claims benefit under 35 U.S.C. § 119(e) from U.S. Provisional Patent Application No. 62/653,363 (filed Apr. 5, 2018) and U.S. Provisional Patent Application No. 62/675,524 (filed May 23, 2018), both of which are entitled "Viewpoint Metadata for Omnidirectional Video," and both of which are incorporated herein by reference in their entirety.

BACKGROUND

Omnidirectional video or 360° video is a rapidly growing new format emerging in the media industry. It is enabled by the growing availability of VR devices and is able to provide the viewer a greater sense of presence. Compared to conventional rectilinear video (2D or 3D), 360° video poses a new and difficult set of engineering challenges on video processing and delivery. Enabling comfort and immersive user experience calls for high video quality and very low latency, while the large video size can be an impediment to delivery of 360° video with high quality.

ISO Base Media File Format

Within the ISO/IEC 14496 MPEG-4 standard there are several parts that define file formats for the storage of time-based media. These are all based and derived from the ISO Base Media File Format (ISO BMFF), described in ISO/IEC 14496-12, "Coding of Audio-Visual Objects, Part 12: ISO Base Media File Format", 2015. The ISO BMFF is a structural, media-independent definition. ISO BMFF contains structural and media data information mainly for timed presentations of media data such as audio, video, etc. There is also support for un-timed data, such as meta-data at different levels within the file structure. The logical structure of the file is of a movie that in turn contains a set of time-parallel tracks. The time structure of the file is that the tracks contain sequences of samples in time, and those sequences are mapped into the timeline of the overall movie. ISO BMFF is based in the concept of box-structured files. A box-structured file consists of a series of boxes (sometimes called atoms), which have a size and a type. The types are 32-bit values and usually chosen to be four printable characters, also known a four-character code (4CC). Un-timed data may be contained in a metadata box, at the file level, or attached to the movie box or one of the streams of timed data, called tracks, within the movie.

Dynamic Streaming Over HTTP (DASH).

MPEG Dynamic Adaptive Streaming over HTTP (MPEG-DASH) is a delivery format that dynamically adapts to changing network conditions. MPEG-DASH is described in ISO/IEC 23009-1, "Dynamic adaptive streaming over HTTP (DASH), Part 1: Media Presentation Description and Segment Formats", May 2014, Dynamic HTTP streaming calls for various bitrate alternatives of the multimedia content to be available at the server. In addition, the multimedia content may consist of several media components (e.g. audio, video, text), each of which may have different characteristics. In MPEG-DASH, these characteristics are described by Media Presentation Description (MPD).

FIG. 2 illustrates the MPD hierarchical data model. The MPD describes the sequence of Periods, where a consistent set of encoded versions of the media content components does not change during a Period. Each Period has a starting time and duration, and is composed of one or multiple adaptation sets (Adaptation Set).

An adaptation set represents a set of encoded versions of one or several media content components that have a property in common, such as the language, the media type, the picture aspect ratio, the role, the accessibility, and the rating property. For instance, an adaptation set may contain different bitrates of the video component of the same multimedia content. Another adaptation set may contain different bitrates of the audio component (e.g. lower quality stereo and higher quality surround sound) of the same multimedia content. Each adaptation set usually includes multiple representations.

A representation describes a deliverable encoded version of one or several media components, varying from other representations by bitrate, resolution, number of channels or other characteristics. Each representation consists of one or multiple segments. The attributes of Representation element such as @id, @bandwidth, @qualityRanking, and @dependencyId are used to specify the properties of the associated representation. Representations may also include sub-representations, which are part of the representation, to describe and extract partial information from a representation. Sub-representations may provide the ability to access a lower quality version of the representation in which they are contained.

A segment is the largest unit of data that can be retrieved with a single HTTP request. Each segment has a URL, an addressable location on a server, which can be downloaded using HTTP GET or HTTP GET with byte ranges.

To use this data model, the DASH client parses the MPD XML document, selects a collection of adaptation sets suitable for its environment based on information provided in each of the AdaptationSet elements. Within each adaptation set, the client selects one representation, typically based on the value of a @bandwidth attribute, but also taking into account client decoding and rendering capabilities. The client downloads the initialization segment of the selected representations and then accesses the content by requesting entire segments or byte ranges of segments. Once the presentation has started, the client continues consuming the media content by continuously requesting media segments or parts of media segments and playing content according to the media presentation timeline. The client may switch representations taking into account updated information from its environment. The client should play the content continuously across periods. Once the client is consuming media contained in the segments towards the end of the announced media in the representation, then either the media presentation is terminated, a new period is started, or the MPD is re-fetched.

Descriptors in DASH.

MPEG-DASH uses descriptors to provide application-specific information about the media content. Descriptor elements are all structured in the same way, namely they contain a @schemeIdUri attribute that provides a URI to identify the scheme and an optional attribute @value and an optional attribute @id. The semantics of the element are specific to the scheme employed. The URI identifying the scheme may be a URN or a URL. The MPD does not provide any specific information on how to use these elements. It is up to the application that employs DASH formats to instantiate the description elements with appropriate scheme information. DASH applications that use one of these elements first define a scheme identifier in the form of a URI and then define the value space for the element when that scheme identifier is used. If structured data is used, then any extension element or attribute may be defined in a separate namespace. Descriptors may appear at a number of levels within the MPD. The presence of an element at the MPD level means that the element is a child of the MPD element. The presence of an element at the adaptation set level indicates that the element is a child element of an AdaptationSet element. The presence of an element at the representation level indicates that the element is a child element of a Representation element.

Omnidirectional Media Format.

Omnidirectional Media Format (OMAF) is a systems standard developed by MPEG as Part 2 of MPEG-I, a set of standards for coding, representation, storage, and delivery of immersive media. OMAF defines a media format that enables omnidirectional media applications and focuses mainly on 360° videos, images, audio, and associated timed-metadata. The Final Draft of International Standard (FDIS) of OMAF was released early 2018 and is described in ISO/IEC JTC1/SC29/WG11 N17399 "FDIS 23090-2 Omnidirectional Media Format", February 2018.

As part of Phase 1b of MPEG-I, an extension of OMAF supporting a number of new features including 3DoF plus motion parallax and support for multiple viewpoints is planned for 2019. The requirements for Phase 1b were released in February 2018 and are described in ISO/IEC JTC1/SC29/WG11 N17331 "MPEG-I Phase 1b Requirements", February 2018. The OMAF and MPEG-I Phase 1b requirements describe the following concepts:

Field-of-view (FoV) is the extent of the observable world in captured/recorded content or in a physical display device.

Viewpoint is the point from which the user views the scene; it usually corresponds to a camera position. Slight head motion does not necessarily imply a different viewpoint.

Sample is all the data associated with a single time.

Track is a timed sequence of related samples in an ISO base media file. For media data, a track corresponds to a sequence of images or sampled audio.

Box is an object-oriented building block in an ISO based media file defined by a unique type identifier and length.

SUMMARY

In some embodiments, systems and methods are provided for signaling position information for one or more viewpoints in an omnidirectional video presentation. In some embodiments, a method includes: receiving a manifest (e.g. an MPEG-DASH MPD) for an omnidirectional video presentation, the video presentation having at least one omnidirectional video associated with a viewpoint; determining based on the manifest whether a timed-metadata track of viewpoint position is provided for the viewpoint; and in response to a determination that the timed-metadata track is provided, determining the viewpoint position based on information in the timed-metadata track.

In some embodiments, determining whether a timed-metadata track of viewpoint position is provided includes determining whether a flag in the manifest indicates that the viewpoint position is dynamic.

In some embodiments, the manifest includes coordinates indicating a first viewpoint position.

In some embodiments, the timed-metadata track is identified in the manifest, and the method further comprises fetching the timed-metadata track.

In some embodiments, the timed-metadata track includes viewpoint positions in cartesian coordinates. In other embodiments, the timed-metadata track includes viewpoint positions in longitude and latitude coordinates.

In some embodiments, the method further includes displaying to a user a user interface, where the user interface allows a user to select the omnidirectional video based on the viewpoint position of the omnidirectional video. The omnidirectional video is displayed to the user in response to user selection of the omnidirectional video.

In some embodiments, the omnidirectional video presentation includes at least a first omnidirectional video and a second omnidirectional video. In such embodiments, the displaying of the user interface may include: displaying the first omnidirectional video to the user; and displaying a user interface element or other indication of the second omnidirectional video at a location in the first omnidirectional video at a location corresponding to the location of a viewpoint of the second omnidirectional video.

Methods are described herein for signaling information regarding different viewpoints in a multi-viewpoint omnidirectional media presentation. In some embodiments, a container file (which may use the ISO Base Media File Format) is generated containing several tracks. The tracks are grouped using a track-group identifier, where each track-group identifier is associated with a different viewpoint. In some embodiments, a manifest (such as an MPEG-DASH MPD) is generated, where the manifest includes viewpoint identifiers that identify the viewpoint associated with each stream. In some embodiments, metadata included in a container file and/or in a manifest provides information on one or more of the following: the position of each viewpoint, the effective range of each viewpoint, the intervals during which each viewpoint is available, transition effects for transitions between viewpoints, and recommended projection formats for different field-of-view ranges.

In some embodiments, a method is provide for generating a container file (e.g., an ISO Base Media File Format file). At least first and second 360-degree video data is received, the first video data representing a view from a first viewpoint and the second 360-degree video data representing a view from a second viewpoint. A container file is generated for at least the first video data and the second video data. In the container file, the first video data is organized into a first set of tracks and the second video data is organized in a second set of tracks. Each of the tracks in the first set of tracks includes a first track-group identifier associated with the first viewpoint, and each of the tracks in the second set of tracks includes a second track-group identifier associated with the second viewpoint.

In some such embodiments, each of the tracks in the first set of tracks includes a respective instance of a viewpoint-group-type box that contains the first track-group identifier, and each of the tracks in the second set of tracks includes a respective instance of a viewpoint-group-type box that contains the second track-group identifier.

In some embodiments, the container file is organized in a hierarchical box structure, and the container file includes a viewpoint-list box that identifies at least a first viewpoint-information box and a second viewpoint-information box. The first viewpoint-information box includes at least (i) the first track-group identifier and (ii) an indication of time intervals for which video from the first viewpoint is available. The second viewpoint-information box includes at least (i) the second track-group identifier and (ii) an indication of time intervals for which video from the second viewpoint is available. The indications of time intervals may be lists of instances of respective viewpoint availability interval boxes.

In some embodiments, the container file is organized in a hierarchical box structure, and the container file includes a viewpoint-list box identifying at least a first viewpoint-information box and a second viewpoint-information box. The first viewpoint-information box includes at least (i) the first track-group identifier and (ii) an indication of a position of the first viewpoint. The second viewpoint-information box includes at least (i) the second track-group identifier and (ii) an indication of a position of the second viewpoint. The indications of position may include cartesian coordinates or latitude and longitude coordinates, among other options.

In some embodiments, the container file is organized in a hierarchical box structure, and the container file includes a viewpoint-list box identifying at least a first viewpoint-information box and a second viewpoint-information box. The first viewpoint-information box includes at least (i) the first track-group identifier and (ii) an indication of an effective range of the first viewpoint. The second viewpoint-information box includes at least (i) the second track-group identifier and (ii) an indication of an effective range of the second viewpoint.

In some embodiments, the container file is organized in a hierarchical box structure, the container file includes a transition-effect-list box identifying at least one transition-effect box, and each transition-effect box includes (i) an identifier of a source viewpoint, (ii) an identifier of a destination viewpoint, and (iii) an identifier of a transition type. The identifier of the transition type may identify a basic transition, a viewpoint path transition, or an auxiliary-information-viewpoint-transition, among other options. In a case of a viewpoint path transition, a path-viewpoint-transition box may be provided that includes a list of viewpoint identifiers. In the case of an auxiliary-information-viewpoint-transition, an auxiliary-information-viewpoint-transition box may be provided that includes a track identifier.

In some embodiments, the container file is organized in a hierarchical box structure including a meta box, and the meta box identifies at least one recommended-projection-list box. Each recommended-projection-list box may include information identifying (i) a projection type and (ii) a corresponding field-of-view range for the projection type. The information identifying the field-of-view range may include (i) a minimum horizontal field of view angle; (ii) a maximum horizontal field of view angle; (iii) a minimum vertical field of view angle; and (iv) a maximum vertical field of view angle.

In some embodiments, a method is provided for generating a manifest, such as an MPEG-DASH MPD. At least first 360-degree video data representing a view from a first viewpoint and second 360-degree video data representing a view from a second viewpoint are received. A manifest is generated. In the manifest, at least one stream in a first set of streams is identified, each stream in the first set representing at least a portion of the first video data. At least one stream in a second set of streams is also identified in the manifest, each stream in the second set representing at least a portion of the second video data. Each of the streams in the first set is associated in the manifest with a first viewpoint identifier, and each of the streams in the second set is associated in the manifest with a second viewpoint identifier.

In some embodiments, each of the streams in the first set is associated in the manifest with a respective adaptation set that has the first viewpoint identifier as an attribute; and each of the streams in the second set is associated in the manifest with a respective adaptation set that has the second viewpoint identifier as an attribute.

In some embodiments, each of the streams in the first set is associated in the manifest with a respective adaptation set that has the first viewpoint identifier in a first descriptor; and each of the streams in the second set is associated in the manifest with a respective adaptation set that has the second viewpoint identifier in a second descriptor.

In some embodiments, the manifest further includes an attribute indicating an effective range for each of the viewpoints. In some embodiments, the manifest further includes an attribute indicating a position for each of the viewpoints. The attribute indicating position may include Cartesian coordinates or latitude and longitude coordinates.

In some embodiments, the manifest further includes, for each viewpoint, information indicating at least one time period during which video for the respective viewpoint is available.

In some embodiments, of a method for generating a manifest, the first video data and second video data are received in a container file in which: the first video data is organized into a first set of tracks and the second video data is organized in a second set of tracks; each of the tracks in the first set of tracks includes a first track-group identifier associated with the first viewpoint; and each of the tracks in the second set of tracks includes a second track-group identifier associated with the second viewpoint. The viewpoint identifiers used in the manifest may be equal to the respective track-group identifiers in the container file.

Some embodiments may be implemented by a client device, such as a device equipped with a head-mounted display or other display device for 360-degree video. In some such methods, a manifest identifying a plurality of 360-degree video streams is received, where the manifest includes information identifying a viewpoint location of each respective stream. A first video stream identified in the manifest is retrieved and displayed. A user interface element indicating the viewpoint location of a second video stream identified in the manifest is overlaid on the display of the first video stream. In response to selection of the user interface element, the second video stream is retrieved and displayed.

In some such embodiments, the manifest further includes information identifying an effective range of at least one of the identified streams, and the client further displays an indication of the effective range.

In some embodiments, the manifest further includes information identifying a period of availability of the second video stream, and the user interface element is displayed only during the period of availability.

In some embodiments, the manifest further includes information identifying a transition type for a transition from the first video stream to the second video stream. In response to selection of the user interface element, the client presents a transition having the identified transition type, and the second video stream is displayed after the presentation of the transition.

In some embodiments, the manifest further includes information identifying a location of at least one virtual viewpoint. In response to selection of the virtual viewpoint, the client synthesizes a view from the virtual viewpoint and displays the synthesized view. One or more synthesized views may be used in a transition.

Methods are further described for selecting a projection format. In some embodiments, a client receives a manifest that identifies a plurality of 360-degree video streams. The manifest includes information identifying a respective projection format of each of the video streams. The manifest further includes information identifying a respective range of field-of-view sizes for each of the projection formats. The client determines a field-of-view size for display. The client then selects at least one of the video streams such that the determined field-of-view size is within the identified range of field-of-view sizes for the projection format of the selected video streams. The client retrieves at least one of the selected video streams and displays the retrieved video stream with the determined field-of-view size.

Further encompassed in the present disclosure are systems comprising a processor and a non-transitory computer-readable medium storing instructions operative when executed on the processor to perform any of the methods described herein. Also encompassed in the present disclosure are non-transitory computer-readable storage media storing one or more container files or manifests generated using the methods disclosed herein.

EXAMPLE NETWORKS FOR IMPLEMENTATION OF THE EMBODIMENTS

Figure 1A:
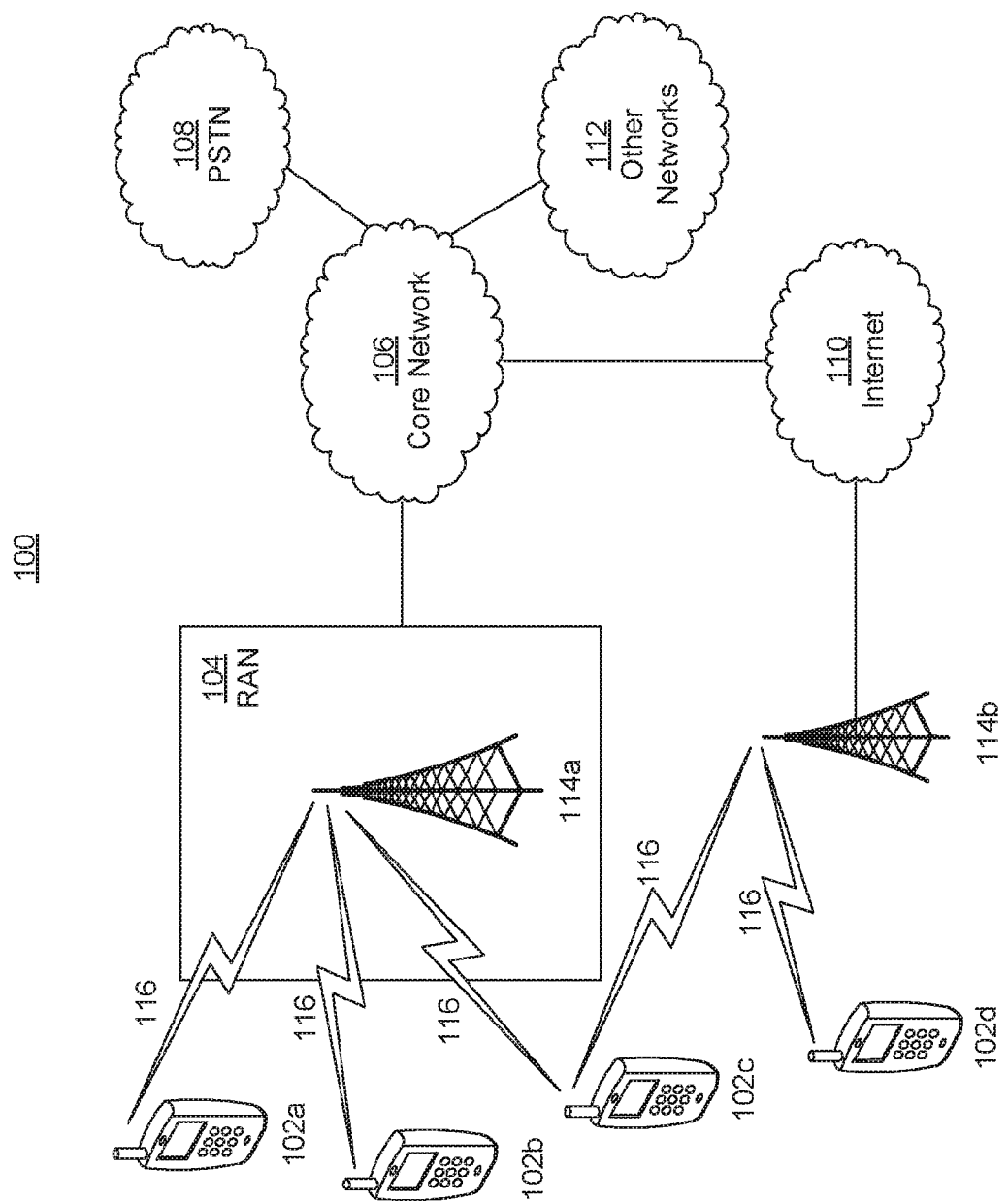
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
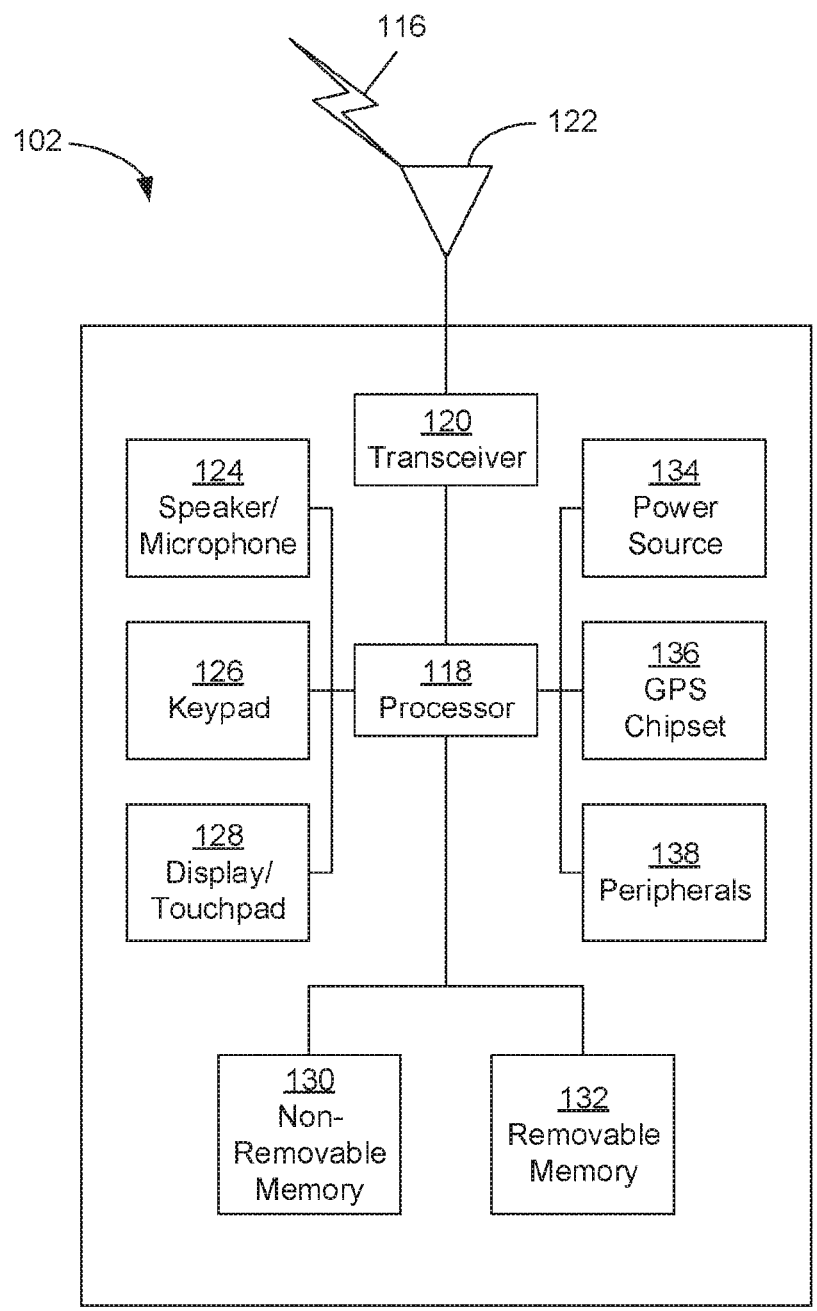
FIG. 1B is a system diagram illustrating an example wireless transmit/receive unit (WTRU) that may be used within the communications system illustrated in FIG. 1A according to an embodiment.
Figure 2:
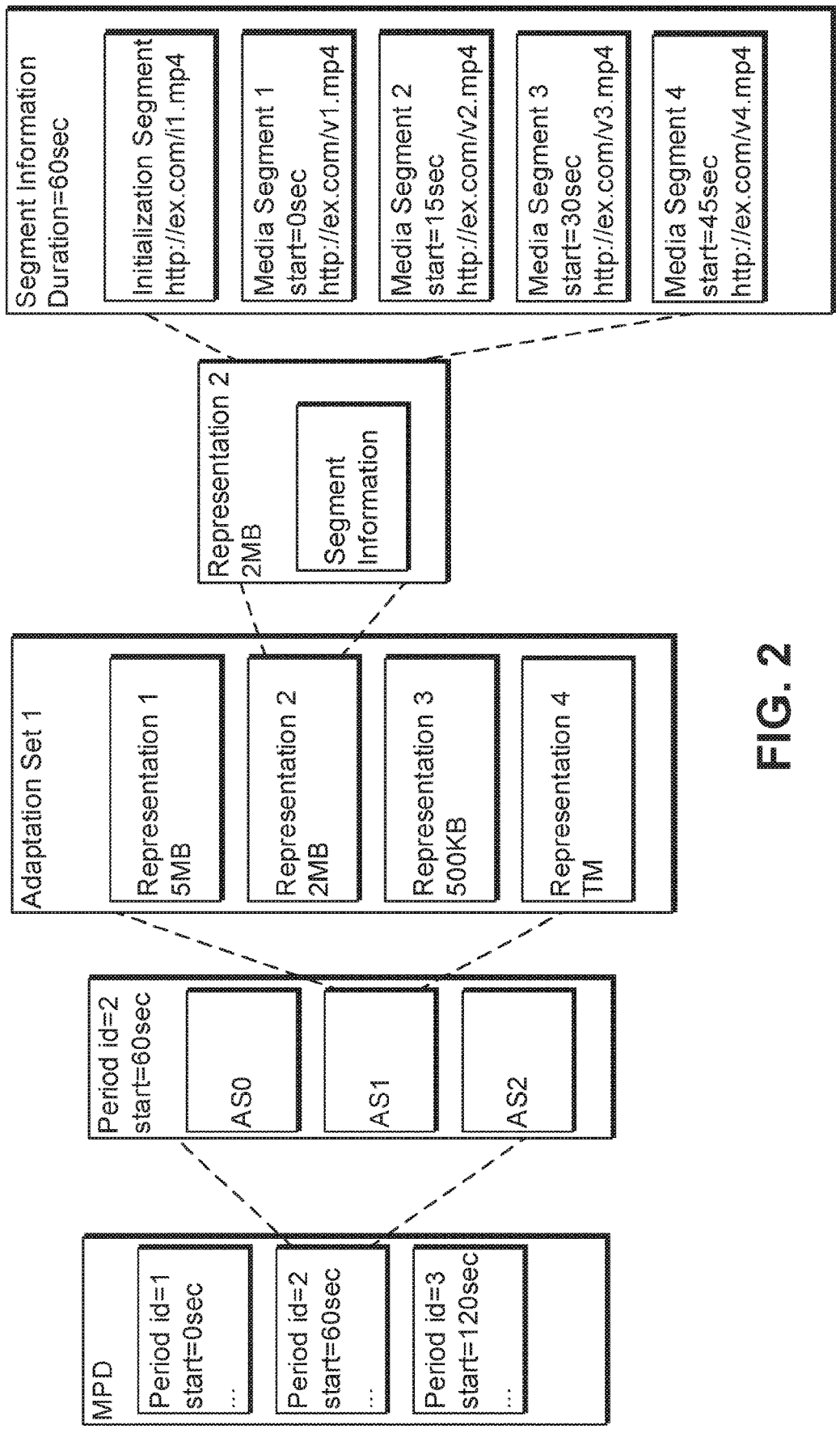
FIG. 2 illustrates an MPD hierarchical data model.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

In view of FIGS. 1A-1B, and the corresponding description of FIGS. 1A-1B, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Issues Addressed in Some Embodiments.

Figure 3:
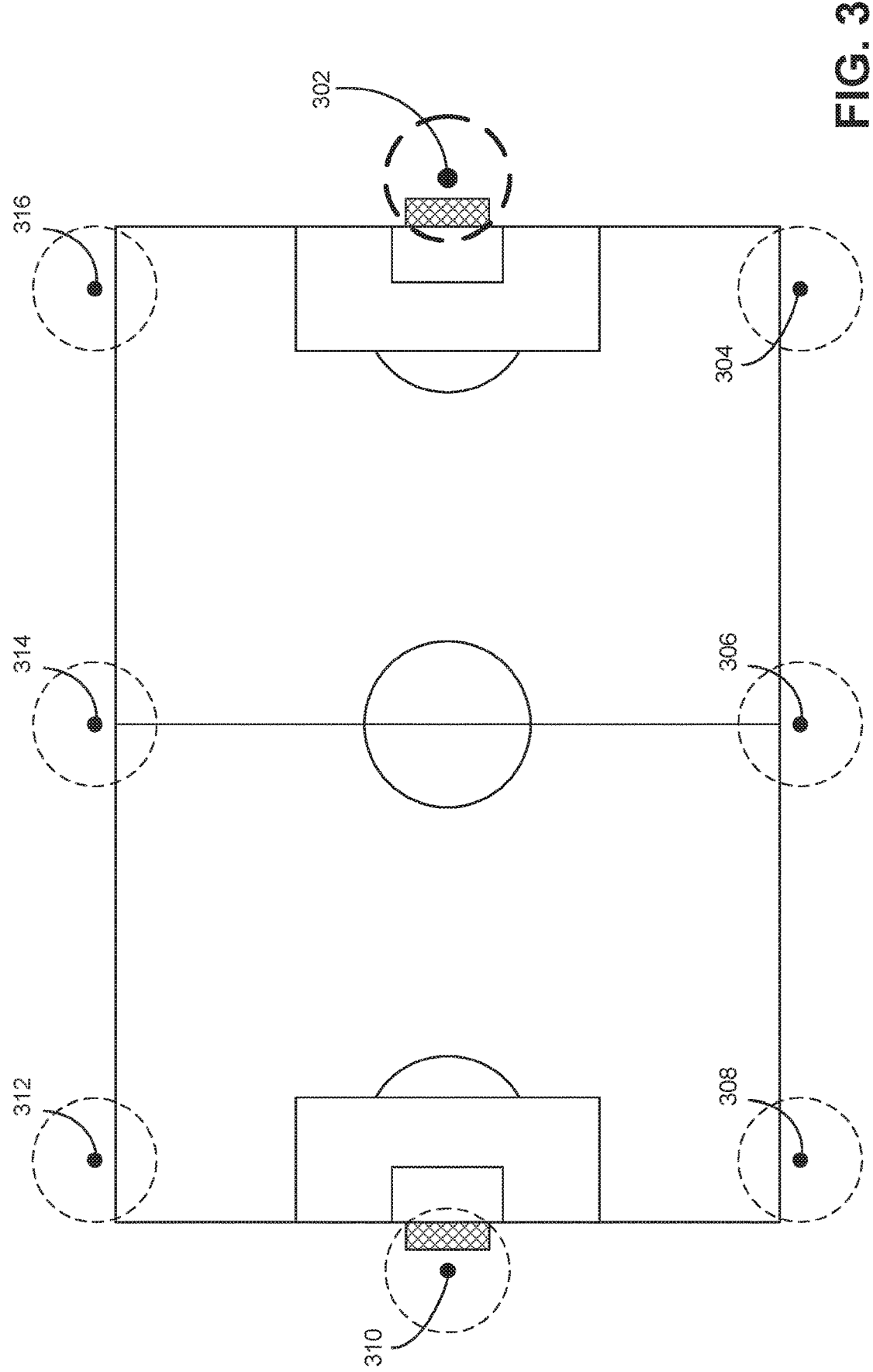
FIG. 3 illustrates a user interface (UI) showing available viewpoints in a presentation example.

An omnidirectional video provides a 360-degree experience that enables the viewer to watch the video in all directions around a central viewing position. However, the viewer has generally been limited to a single viewpoint and is not able to navigate the scene by changing their viewpoint. For large-scale events such as the Olympic Games opening ceremony, NFL or NBA tournaments, carnival parades, etc., a single 360° video camera is not enough to capture the entire scene. A more enhanced experience can be provided by capturing the scene from multiple viewpoints and providing the user with the ability to switch between different viewpoints while watching the video. FIG. 3 shows a user interface that may be presented to the user in some embodiments to indicate available viewpoints. In this example, the user interface displays an overhead view of a venue and provides indications of locations of available viewpoints. In this case, viewpoint 302 is the active viewpoint (the viewpoint from which the user is currently experiencing the presentation) and is displayed in a highlighted fashion. Other viewpoints, such as viewpoints 304, 306, 308, 310, 312, 314, 316, may be displayed to indicate their availability, but they are not currently selected by the user.

During playback, a user interface such as that illustrated in FIG. 3 may be overlaid over the rendered frame at one of the four corners for example, and the user can select a different viewpoint using a user input device such as a touch screen or an HMD controller. A viewpoint switch is then triggered and the user's view is transitioned so that frames from the target viewpoint are rendered on the display. In some embodiments, a transition effect (e.g., fade-out/fade-in) accompanies the transition between viewpoints.

Figure 4:
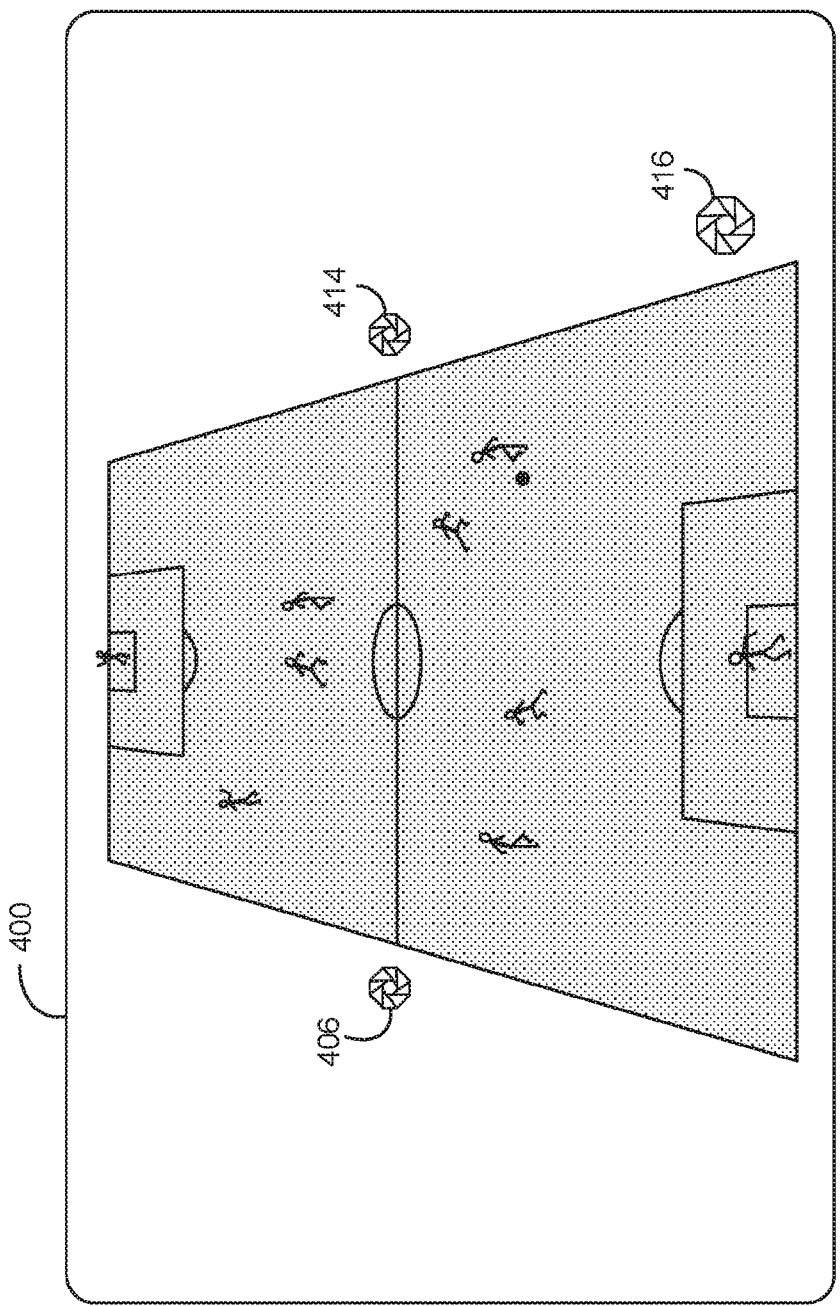
FIG. 4 illustrates another UI design example to indicate multiple viewpoints by overlaying the available viewpoint icons on an HMD display.

FIG. 4 illustrates another user design example in which the location of available viewpoints is indicated using icons displayed as overlays on content 400 displayed on a head-mounted display. The position of each viewpoint icon in the users view corresponds to the spatial position of an available viewpoint. In the example of FIG. 4, icons 406, 414 may be displayed to correspond to the viewpoints 306, 314, respectively, of FIG. 3. The viewpoint icons may be rendered with the correct depth effect to allow the user to perceive each viewpoint position in three dimensional space within the scene. For example, an icon 416 (corresponding to viewpoint position 316) may be displayed at a larger size than icons 406, 414 to indicate that the viewpoint corresponding to icon 416 is closer to the current viewpoint. The user can select a viewpoint icon in order to switch the user's view of the rendered scene to the associated viewpoint.

In example embodiments, to enable support for multiple viewpoints, information about the available viewpoints is signaled to the player (which may, for example, be an omnidirectional media player equipped with a DASH client running on a user device such as an HMD). This information may include aspects such as the number of available viewpoints, the position and range of each viewpoint, and when video data are available for a viewpoint. Moreover, since most omnidirectional media presentations are experienced through a head-mounted display, a sudden change in viewpoint may feel unnatural to a viewer who is immersed in a virtual environment. It is therefore preferable to support viewpoint transition effects that would provide a smooth transition when the user changes their viewpoint. These transitions can also be used by content producers to guide the users experience.

Grouping Viewpoint Media Components.

In some embodiments, media samples for omnidirectional media content with multiple viewpoints are stored in a number of tracks within the container file. A video player playing or streaming the content operates to identify which tracks belong to which viewpoint. To enable this, a mapping is provided between the media tracks within the file and the viewpoint to which they belong. In some embodiments, this mapping is signaled at the media container (file format) level. In some embodiments, this mapping is signaled at the transport protocol-level (DASH).

Media Container-Level Signaling (File Format).

In ISO/IEC 14496-12 (ISO BMFF), a TrackGroupBox is defined to enable grouping a number of tracks in the container file that share a certain characteristic or have a particular relationship. The track group box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

```
aligned(8) class TrackGroupBox extends Box('trgr') {
}
```

A track group type is defined extending a TrackGroupTypeBox which contains a track_group_id identifier and a track_group_type which stores a four-character code identifying the group type. The pair of track_group_id and track_group_type identifies a track group within the file.

To group a number of media tracks that belong a single viewpoint together, in some embodiments, a new group type (ViewpointGroupTypeBox) is defined as follows:

```
aligned(8) class ViewpointGroupTypeBox extends
TrackGroupTypeBox('vpgr') {
    // additional viewpoint data can be defined here
}
```

In some embodiments, media have a viewpointGroupTypeBox within the TrackGroupBox, and tracks that belong to the same viewpoint have the same value of track_group_id in the respective ViewpointGroupTypeBox. A 3DoF+ omnidirectional media player can therefore identify available viewpoints by parsing each track in the container and checking the number of unique track_group_id values within the ViewpointGroupTypeBox for each track.

Transport Protocol-Level Signaling (DASH).

The OMAF standard defines delivery-related interfaces for DASH. In some embodiments, information related to the different viewpoints is signaled in the media presentation descriptor. In DASH, each media component is represented by an AdaptationSet element in the MPD. In some embodiments, AdaptationSet elements belonging to the same viewpoint are grouped by either defining an additional attribute to the AdaptationSet element or adding a descriptor to the AdaptationSet where a viewpoint identifier is provided.

A number of descriptors are defined in the MPEG-DASH standard. These include a SupplementalProperty descriptor which can be used by the media presentation author to express that the descriptor contains supplemental information that may be used by the DASH client for optimized processing. The semantics of the signaled information are specific to the scheme employed, which is identified by the @schemeIdUri attribute. In the present disclosure, a number of new XML elements and attributes are described for signaling viewpoint-related information. The new elements can either be defined in the same namespace as the one defined in the latest version of the OMAF standard (urn:mpeg:mpegI:omaf:2017) or in a separate new namespace (urn:mpeg:mpegI:omaf:2019) to distinguish between OMAF v1 features and OMAF v2 features. For the sake of explanation, the namespace (urn:mpeg:mpegI:omaf:2017) is used in the remainder of this document.

To identify and describe the viewpoint to which a media component belongs, embodiments are described in which a SupplementalProperty element is added with a @schemeIdUri attribute equal to "urn:mpeg:mpegI:omaf:2017:ovp". Such a descriptor is referred to herein as an OMAF viewpoint (OVP) descriptor. In some embodiments, at most one OVP descriptor may be present at the adaptation set level. The OVP descriptor may have a @viewpoint_id attribute with a value representing a unique viewpoint identifier. Examples of semantics for @viewpoint_id are given in Table 1. AdaptationSet elements with the same @viewpoint_id value may be recognized by the player as belonging to the same viewpoint.

TABLE 1

Semantics of omaf:@viewpoint_id attribute

| Attribute for OVP descriptor | Use | Data type | Description |
| --- | --- | --- | --- |
| omaf:@viewpoint_id | M | xs:string | Specifies a unique viewpoint within the scene. For ISO Base Media File Format Segments, the value of @viewpoint_id shall be equal to track_group_id in the ViewpointGroupTypeBox in sample entries of the Initialization Segment. |

Signaling Viewpoint Information.

In order for a player to identify the attributes belonging to different viewpoints (e.g., spatial relationship between viewpoints, availability of the viewpoint, etc.), in some methods described herein, additional metadata describing the viewpoint is signaled in the container file (and in the MPD file in the case of streaming). Examples of viewpoint attributes that are signaled in some embodiments include viewpoint position, viewpoint effective range, viewpoint type, and viewpoint availability. Viewpoint position specifies the position of the viewpoint within the 3D space of the captured scene. A viewpoint's effective range is the distance from the viewpoint within which objects can be rendered with a certain level of quality. The certain level of quality may be, for example, a minimum level of quality, a quality level exceeding a known quality threshold, a guaranteed level of quality, or a level of quality approved by or deemed acceptable to the provider of the omnidirectional media content. For example, an object that is within the effective range would be of sufficient size in the rendered image to provide a resolution that provides good quality and ensures an acceptable viewing experience for a user. The effective range of a viewpoint depends on the characteristics of the capturing device (e.g., camera sensor resolution, field-of-view, etc.). The effective range may be determined at least in part by the camera lens density, representing the number of lenses integrated into a 360-degree video camera.

Figure 5:
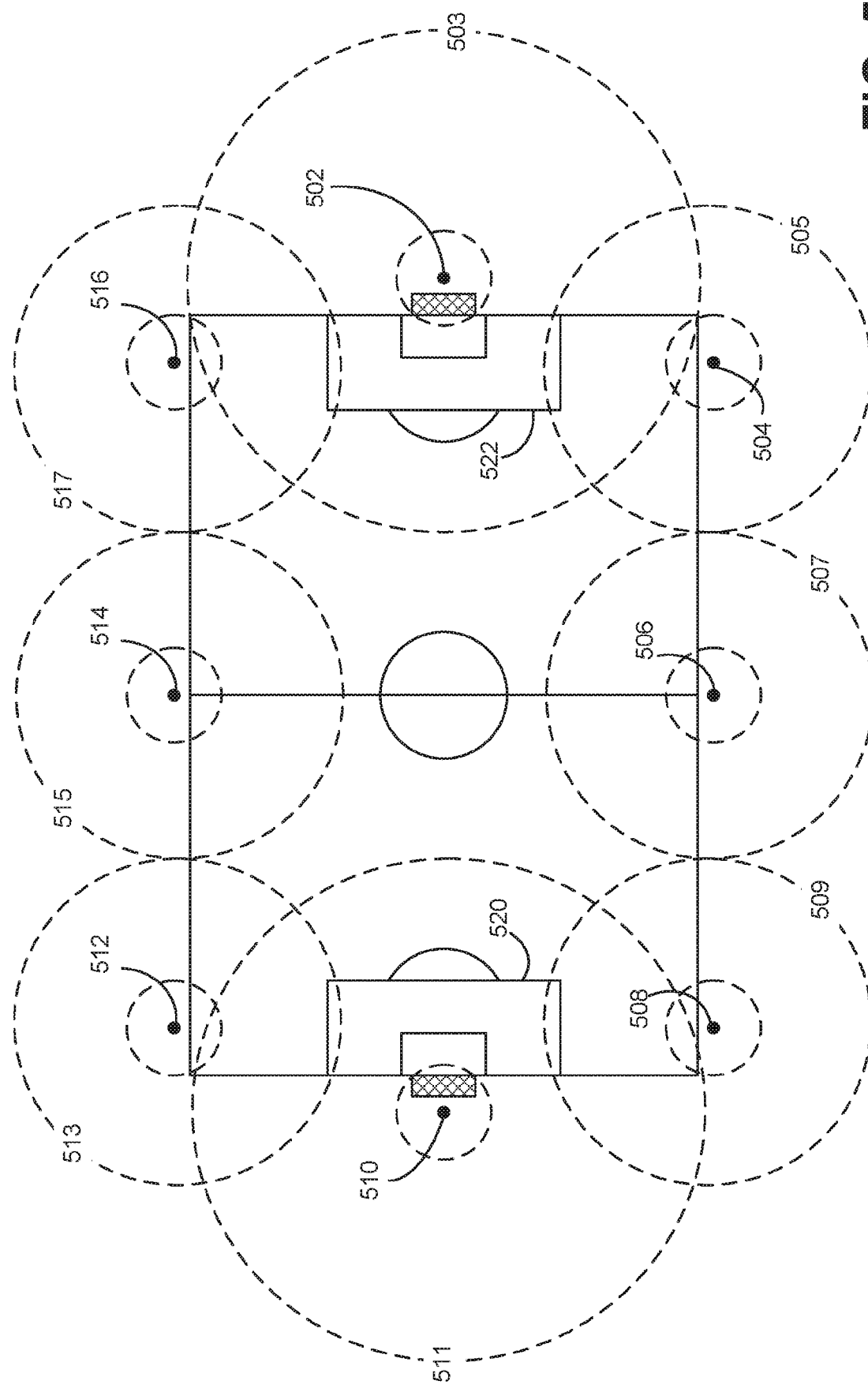
FIG. 5 illustrates an example of viewpoints with different effective ranges.

FIG. 5 shows an example of the effective range of different cameras. In this example, viewpoints 502, 504, 506, 508, 510, 512, 514, and 516 are illustrated along with dotted circles 503, 505, 507, 509, 511, 513, 515, and 517 indicating effective ranges of the respective viewpoints. The omnidirectional cameras located at viewpoints 502 and 510 may contain more lenses to cover a broad area, and so the effective ranges of viewpoints 502 and 510 may be able to cover the penalty areas 520, 522 as illustrated in FIG. 5. The cameras along the side of the field in this example may have fewer lenses so the effective range of these viewpoints (504, 506, 508, 512, 514, 516) may be smaller than that of viewpoints 502 and 510. In general, an omnidirectional camera which has more lenses, more component cameras, or which has higher quality component cameras (e.g. component cameras with high quality optics, high resolution, and/or high frame rate) may be associated with a higher effective range.

In another embodiment, the viewpoint effective range may be determined at least in part by camera lens parameters such as focal length, aperture, depth of field and focus distance, etc. The effective range may define a minimum range and maximum range, with the effective range being between the minimum range and maximum range without stitching error.

A viewpoint may be categorized as a real viewpoint or as a virtual viewpoint. A real viewpoint is a viewpoint where an actual capturing device was placed to capture the scene from that position of the viewpoint. A virtual viewpoint refers to a viewpoint where the rendering of viewports at that position calls for performing additional processing, such as view synthesis, which may make use of auxiliary information and/or video data from one or more other (e.g. real) viewpoints.

Viewpoint availability specifies at what time(s) during the presentation are media data available for the viewpoint.

The user's interaction with a viewport scene such as zoom-in or zoom-out may be supported within the effective range. A virtual viewpoint may only be identified within the effective range of one or multiple cameras. The effective range may also be used as reference to generate a transition path. For example, a transition from viewpoint A to viewpoint B may involve multiple transition viewpoints if the effective range of these viewpoints covers the transition path.

Media Container-Level Signaling of Viewpoint Information.

In ISO BMFF, viewpoint-related information for static viewpoints can be signaled in the 'meta' box (Meta Box) at the file level. The 'meta' box holds static metadata and contains only one mandatory box (HandlerBox) which declares the structure or format of the Meta Box. In some embodiments, for OMAF v2 metadata, the four-character code 'omv2' is used for the handler_type value in the 'hdlr' box. To identify the available viewpoints in the file, some embodiments use a box called OMAFViewpointListBox which contains a list of OMAFViewpointInfoBox instances. Each OMAFViewpointInfoBox holds information about a certain viewpoint. An example of syntax of the OMAFViewpointListBox is as follows.

| Box Type: | 'ovpl' |
| --- | --- |
| Container: | MetaBox |
| Mandatory: | No |
| Quantity: | Zero or one |

```
aligned(8) class OMAFViewpointListBox extends Box('ovpl') {
    unsigned int(16) num_viewpoints;
    OMAFViewpointInfoBox viewpoints[ ];
}
```

An example of semantics for OMAFViewpointListBox is as follows:

num_viewpoints indicates the number of viewpoints in the media file.
viewpoints is a list of OMAFViewpointInfoBox instances.

An example of a syntax of OMAFViewpointInfoBox is given below.

```
Box Type:      'ovpi'
Container:     OMAFViewpointListBox
Mandatory:     No
Quantity:      Zero or more
aligned(8) class OMAFViewpointInfoBox extends Box('ovpi') {
    unsigned int(16) viewpoint_id;
    bit(1) effective_range_flag;
    bit(1) virtual_viewpoint_flag;
    bit(1) dynamic_position_flag;
    bit(5) reserved;
    if (effective_range_flag == 1) {
        unsigned int(32) effective_range;
    }
    unsigned int(32) num_availability_intervals;
    OMAFViewpointPositionGlobalBox( );     // optional
    OMAFViewpointPositionCartesianBox( );  // optional
    OMAFViewpointAvailabilityIntervalBox availability_intervals[ ];
    Box other_boxes[ ];}
```

An example of semantics of OMAFViewpointInfoBox is as follows:
- viewpoint_id is a unique identifier for the viewpoint.
- virtual_viewpoint_flag indicates whether the viewpoint is a viewpoint is a virtual viewpoint (with no capturing device placed at the position of the viewpoint) or a captured viewpoint. Information needed to generate the virtual viewpoint is signaled in the OMAFVirtualViewpointConfigBox.
- dynamic_position_flag indicates whether the position is static or dynamic. If this flag is set, the position of the viewpoint is provided using a timed-metadata track. Otherwise, the position is indicated by an OMAFViewpointPositionGlobalBox and/or an OMAFViewpointPositionCartesianBox in this OMAFViewpointInfoBox.
- effective_range is the radius defining a volumetric sphere centered at the viewpoint for which the viewpoint provides rendering at a certain quality (e.g. a minimum level of quality, a quality level exceeding a known quality threshold, a guaranteed level of quality, or a level of quality approved by or deemed acceptable to the provider of the omnidirectional media content).
- num_availability_intervals indicates the number of time intervals during which this viewpoint is available.
- availability_intervals is a list of OMAFViewpointAvailabilityIntervalBox instances.

In some embodiments, when the viewpoint position in space changes over time, position information is signaled using a timed-metadata track. Timed metadata tracks are tracks within the media container (ISO BMFF) file where the samples represent dynamic metadata information. For dynamic viewpoint position information, some embodiments use a timed-metadata track with the sample entry type 'vpps'. The sample entry for this track may be as follows.

```
aligned(8) class OMAFDynamicViewpointSampleEntry extends
    MetadataSampleEntry('vpps') {
    unsigned int(16) viewpoint_id;
    unsigned int(3) coordinate_system_type;
    bit(5) reserved;
}
```

An example of semantics for the OMAFDynamicViewpointSampleEntry is as follows.
- viewpoint_id is the identifier of the viewpoint for which the samples of this timed-metadata track define the position.
- coordinate_system_type indicates the coordinate system used for defining the position of the viewpoint.

In some embodiments, samples for the viewpoint position metadata track have the following structure.

```
aligned(8) class OMAFViewpointPositionSample {
    if (coordinate_system_type == 1) {
        ViewpointPositionGlobalStruct( );
    } else if (coordinate_system_type == 2) {
        ViewpointPositionCartesianStruct( );
    }
}
```

The sample format may be dependent on the coordinate system type defined in the sample entry of the timed-metadata track. ViewpointPositionGlobalStruct and ViewpointPositionCartesianStruct are described in further detail below.

Transport Protocol-Level Signaling of Viewpoint Information.

To identify and describe the set of viewpoints that are available in a media presentation, some embodiments include a SupplementaryProperty descriptor at the Period level. This descriptor may have a @schemeIdUri equal to "urn:mpeg:mpegI:omaf:2017:ovl" and is referred to herein as an OMAF viewpoint list (OVL) descriptor. In some embodiments, at most one OVL descriptor may be present at the Period level. The OVL descriptor may contain at least one ovp element. An ovp element has an @id attribute with a value representing a unique viewpoint identifier and may contain sub-elements with information about the viewpoint.

Table 2 lists examples of elements and attributes used for signaling viewpoint information in the MPD file for DASH clients. More details are given below.

TABLE 2

Semantics of elements and attributes of example OVL descriptor.

| Elements and attributes for OVL descriptor | Use | Data type | Description |
| --- | --- | --- | --- |
| ovp | 1 ... N | | Container element whose attributes and elements specify the characteristics of a viewpoint. |

TABLE 2-continued

Semantics of elements and attributes of example OVL descriptor.

| Elements and attributes for OVL descriptor | Use | Data type | Description |
|---|---|---|---|
| ovp@id | M | xs:string | A unique identifier for the viewpoint. |
| ovp@effectiveRange | O | xs:unsignedInt | Indicates the range from within the viewpoint (in metres) for which the viewpoint is able to provide a certain quality of rendering (e.g. a minimum level of quality, a quality level exceeding a known quality threshold, a guaranteed level of quality, or a level of quality approved by or deemed acceptable to the provider of the omnidirectional media content). |
| ovp@virtual | OD | xs:boolean | A flag indicating whether the viewpoint is a real viewpoint with a capturing device at the viewpoint position (value 'false') or a virtual viewpoint (value 'true') which requires other reference viewpoints and/or additional auxiliary information to render the scene for the viewpoint position. If not present, the default value is 'false'. |
| ovp@synthesisMethod | CM | xs:unsignedByte | Indicates which indicates the method used to generate the virtual viewpoint. This attribute shall only be present when @virtual has the value 'true'. |
| ovp@refViewpointIds | CM | xs:string | A comma separated list of viewpoint identifiers. The viewpoints in this list are used as references by the synthesis process that generates this (virtual) viewpoint. This attribute shall be present only when @virtual has the value 'true'. |
| ovp@dynamicPosition | OD | xs:boolean | A flag indicating whether the position of the viewpoint changes over time or is static. If not present, the default value is 'false'. |
| ovp:position | CM | omaf:viewpointPositionType | A container element whose elements identify the position of the viewpoint within the world of the presentation. This element is present only when @dynamicPosition = 'false' |
| ovp:position:global | O | omaf:viewpointGlobalPositionType | An element whose attributes identify the position of the viewpoint in terms of geolocation. |
| ovp:position:global@longitude | M | xs:double | Longitude value of the viewpoints position measured in degrees. |
| ovp:position:global@latitude | M | xs:double | Latitude value of the viewpoint's position measured in degrees. |
| ovp:position:global@altitude | O | xs:double | Altitude value of the viewpoint's position measured in degrees. |
| ovp:position:Cartesian | O | omaf:viewpointCartesianPositionType | An element whose attributes identify the position of the viewpoint in terms of Cartesian coordinates. |
| ovp:position:cartesian@x | M | xs:int | The x-axis coordinate. |
| ovp:position:cartesian@y | M | xs:int | The y-axis coordinate. |
| ovp:position:cartesian@z | OD | xs:int | The z-axis coordinate. If not present, the default value is zero. |
| ovp:availability | 1 ... N | omaf:viewpointAvailabilityType | An element whose attributes define a time interval during which the viewpoint is available in the presentation. |
| ovp:availability@start | M | xs:unsignedLong | Presentation time which defines the start of a time interval during which the viewpoint is available. The viewpoint may not be available before this time. The value of the presentation time in seconds is the division of the value of this attribute and the value of the @timescale attribute. |
| ovp:availability@end | O | xs:unsignedLong | Presentation time which defines the end of a time interval during which the viewpoint is available. The viewpoint may no longer be available after this time. The value of the presentation time in seconds is the division of the value of this attribute and the value of the @timescale |

TABLE 2-continued

Semantics of elements and attributes of example OVL descriptor.

| Elements and attributes for OVL descriptor | Use | Data type | Description |
|---|---|---|---|
| | | | attribute. If not present, the viewpoint continues to be available until the end of the presentation. |

In Table 2 and other tables in the present disclosure, elements are bold; attributes are non-bold and preceded with an @. "M" indicates that, in the particular embodiment shown in the table, the attribute is mandatory, "O" indicates that, in the particular embodiment shown in the table, the attribute is optional, "OD" indicates that, in the particular embodiment shown in the table, the attribute is optional with a default value, "CM" indicates that, in the particular embodiment shown in the table, the attribute is conditionally mandatory. <minOccurs> . . . <maxOccurs> (N=unbounded).

The data types for various elements and attributes are as defined in the XML schema. An XML schema for ovp is provided in the section "XML Schema for DASH signaling," below.

Viewpoint Position.

"Real" viewpoints correspond to 360° video cameras that are placed at different positions to capture the scene from different vantage points. In some embodiments, viewpoints may represent views from virtual positions. The virtual positions may represent points which are not associated with the location of a physical camera. The virtual positions may represent points from which synthetic content may be rendered, or points from which content captured by one or more cameras at other (real) viewpoints may be transformed, processed or combined in order to synthesize a virtual view. To provide the player with useful information on the camera setup used to capture the scene and their layout, the spatial relationship between the viewpoints in some embodiments is signaled by providing the position of each viewpoint. Position information may be represented in different ways in different embodiments. In some embodiments, global geolocation coordinates similar to the ones used by GPS systems may be used to identify to location of the camera/viewpoint. Alternatively, the Cartesian coordinate system may be used for positioning.

Media Container-Level Signaling of Viewpoint Position.

Described herein are two examples of boxes that may be used to identify the position of the viewpoint when present in the OMAFViewpointInfoBox, namely OMAFViewpointPositionGlobalBox and OMAFViewpointPositionCartesianBox. In some embodiments, these boxes are optional. An example syntax of the proposed position boxes is given below. Additional boxes may also be introduced to provide position information based on other coordinate systems.

Box Type: 'vpgl'
Container: OMAFViewpointInfoBox
Mandatory: No
Quantity: Zero or one
aligned(8) class ViewpointPositionGlobalStruct( ) {
   signed int(32) longitude;
   signed int(32) latitude;
   signed int(32) altitude;
}

-continued aligned(8) class OMAFViewpointPositionGlobalBox extends Box('vpgl') {
   ViewpointPositionGlobalStruct( );
}

In some embodiments, double-precision or floating point types are used for the longitude, latitude, and/or altitude values.

Box Type: 'vpcr'
Container: OMAFViewpointInfoBox
Mandatory: No
Quantity: Zero or one
aligned(8) class ViewpointPositionCartesianStruct( ) {
   signed int(32) x;
   signed int(32) y;
   signed int(32) z;
}
aligned(8) class OMAFViewpointPositionCartesianBox extends Box('vpcr')
{
   ViewpointPositionCartesianStruct( );
}

Transport Protocol-Level Signaling of Viewpoint Position.

To signal the position of a viewpoint, in some embodiments, an ovp:position element may be added to the ovp element. This element may include an ovp:position:global element and/or an ovp:position:cartesian element. In some embodiments, at most one of each of these elements is present within an ovp:position element. Attributes of the ovp:position:global element provide the position of the viewpoint in terms of global geolocation coordinates in units of degrees. In some embodiments, the ovp:position:global element has three attributes: @longitude, @latitude, and @altitude. In some embodiments, the @altitude attribute is optional and may not be present. Attributes of the ovp:position:catersian attribute provide the position of the viewpoint in terms of Cartesian coordinates. In some embodiments, three attributes are defined for the ovp:position:cartesian element: @x, @y, and @z, where only @z is optional.

Viewpoint Availability.

In some cases, a viewpoint may not be available for the entire duration of the media presentation. Therefore, in some embodiments, the availability of a viewpoint is signaled before the media samples for that viewpoint are processed. This enables a player to only process the samples for the tracks belonging to a specific viewpoint when the viewpoint is available.

Figure 6:
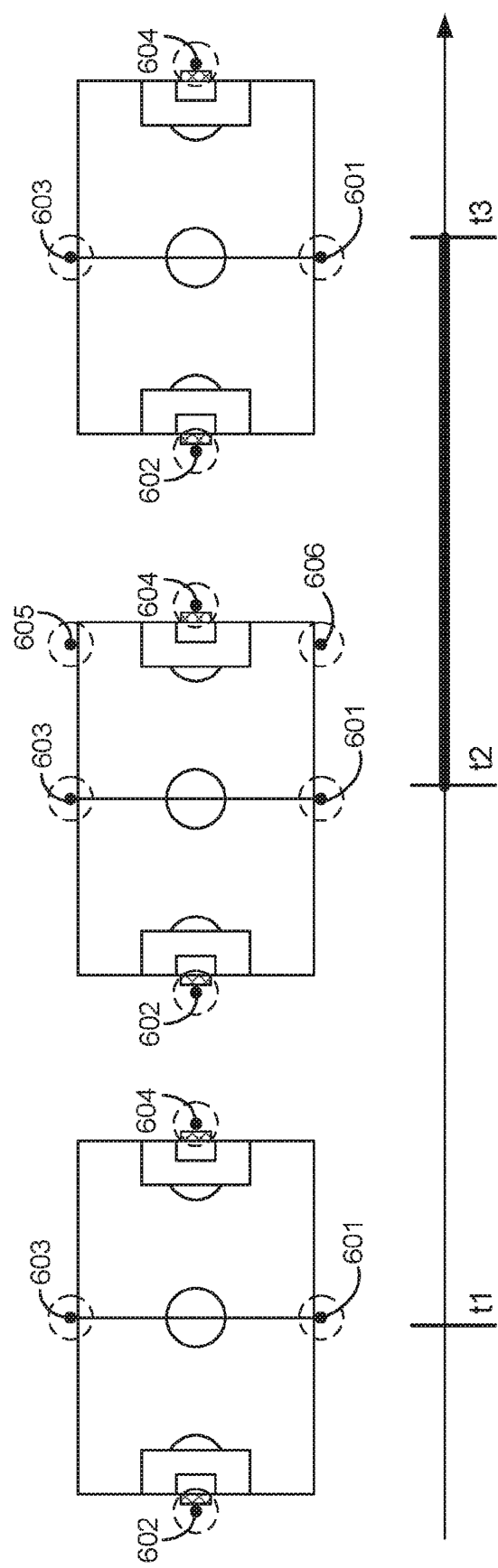
FIG. 6 illustrates changes in viewpoint availability over time.

Changes in viewpoint availability over time are illustrated in FIG. 6. At time t1, only viewpoints 601, 602, 603, and 604 are available. Later during the presentation at time t2, a penalty shot is given to one of the teams and most of the players are close to the goal on the right side. At that point in time, two additional viewpoints 605 and 606 are made available to the user until time t3. The time interval between t2 and t3 is an availability interval for viewpoints 605 and 606. Using viewpoint availability information (e.g. received from a server), a player or streaming client operates to indicate to the user the availability of additional viewpoints at time t2 during playback, e.g., using the UI shown in FIG. 3 or FIG. 4. At the start of an availability interval, the player may present options to the user to switch to any or all of the viewpoints which are available (e.g. are newly available) during the availability interval. As shown in FIG. 6, the user may be given the options to switch to viewpoints 605 or 606 starting from time t2. At the end of an availability interval, the player may remove options to switch to viewpoints which are no longer available after the availability interval ends. In some embodiments, if the user is still at one of these viewpoints when the availability interval ends (e.g. at time t3 as illustrated in FIG. 6), the user may be returned to the viewpoint at which the user was prior to switching to the viewpoint which is no longer available (e.g. viewpoint 605 or 6066 as illustrated in FIG. 6). In some embodiments, viewpoint availability intervals may also be signaled for virtual viewpoints. However, the availability of these viewpoints is dependent on the availability of other reference viewpoints as well as any auxiliary information used to support the rendering of the virtual viewpoint.

Media Container-Level Signaling of Viewpoint Availability.

In some embodiments, a box (OMAFViewpointAvailaibilityIntervalBox) is introduced to signal availability intervals. Zero or more instances of this box may be present in an OMAFViewpointInfoBox. When no OMAFViewpointAvailaibilityIntervalBox instances are present for a viewpoint, this indicates that the viewpoint is available for the entire duration of the presentation.

| | |
|---|---|
| Box Type: | 'vpai' |
| Container: | OMAFViewpointInfoBox |
| Mandatory: | No |
| Quantity: | Zero or more |

```
aligned(8) class OMAFViewpointAvailabilityIntervalBox
extends Box('vpai') {
   bit(1) open_interval_flag;
   bit(7) reserved;
   unsigned int(64) start_time;   // mandatory
   unsigned int(64) end_time;
}
```

An example of semantics for OMAFViewpointAvailabilityIntervalBox is as follows:

open_inverval_flag a flag indicating the availability interval is an open interval (value 1) where the viewpoint is available from start_time until the end of the presentation, or a closed interval (value 0). If the flag is set (value 1), no end_time field is present in this box.

start_time the presentation time at which the viewpoint is available (corresponds to the composition time for the first sample in the interval).

end_time the presentation time after which the viewpoint is no longer available (corresponds to the composition time of the last sample in the interval).

Transport Protocol-Level Signaling of Viewpoint Availability.

In some embodiments, to signal the availability of a viewpoint in the MPD file, one or more ovp:availability elements may be added to an instance of the ovp element. This element signifies an availability period and has two attributes, @start and @end, indicating the presentation time at which the viewpoint is available and the presentation time of the last sample of the availability interval, respectively.

Virtual Viewpoints.

Figure 8:
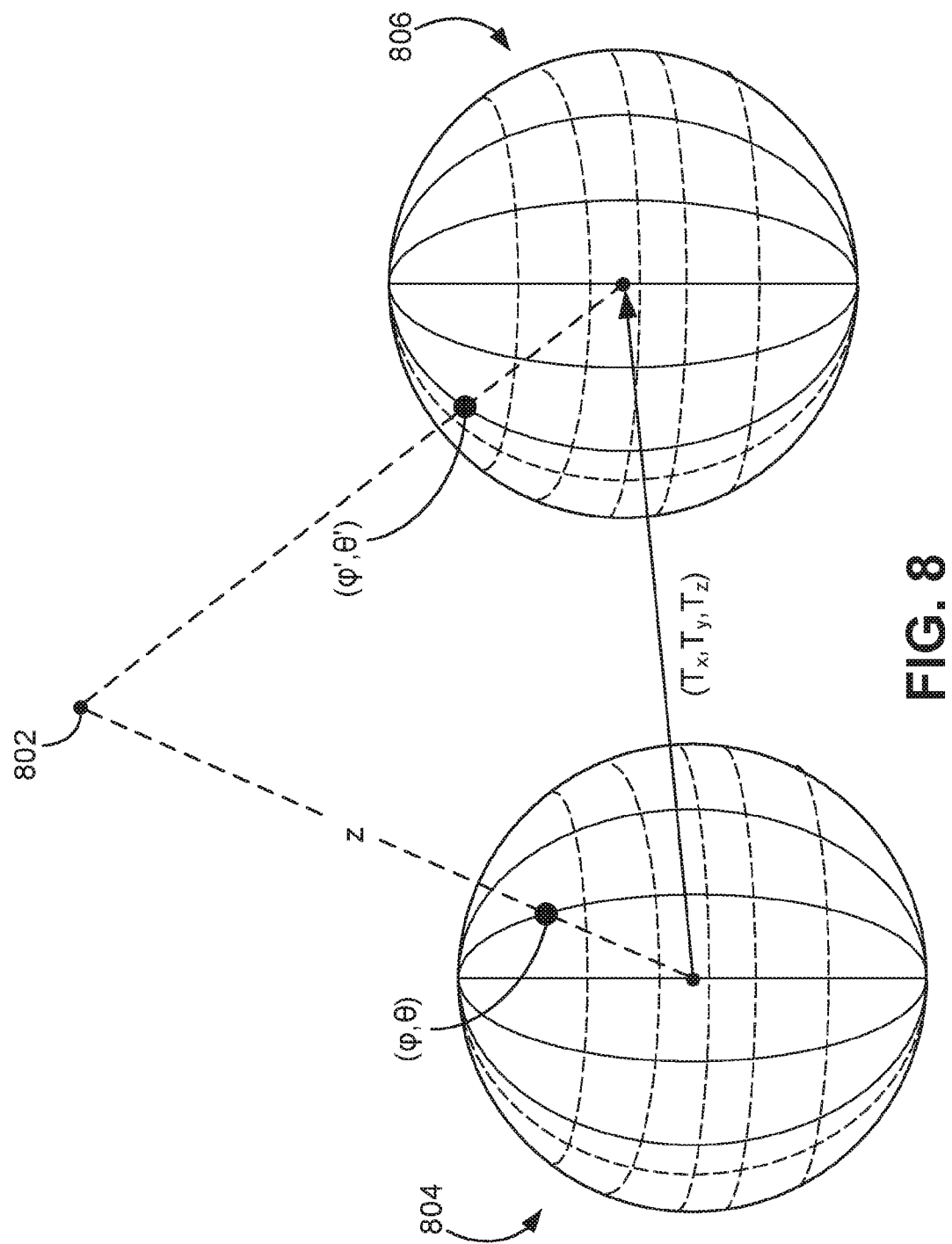
FIG. 8 illustrates mapping of pixels from a reference viewpoint to a target virtual viewpoint.

In some embodiments, virtual viewpoints are generated using an omnidirectional virtual view synthesis process. In some embodiments, this process makes use of one or more input (reference) viewpoints and their associated depth maps and additional metadata describing the translation vectors between the input viewpoints positions and the virtual viewpoint position. In some such embodiments, each pixel of the input omnidirectional viewpoints is mapped to a position in the virtual viewpoint sphere by mapping the pixels of the equirectangular frames of the reference viewpoints to points in 3D space and then projecting them back at the target virtual viewpoint. One such view synthesis process is described in greater detail in "Extended VSRS for 360-degree video", MPEG121, Gwangju, Korea, January 2018, m41990, and is illustrated in FIG. 8. In the example of FIG. 8, a point 802 has a position described by angular coordinates $(\varphi,\theta)$ and depth z with respect to an input viewpoint 804. In the generation of a virtual viewpoint 806, which is displaced from input viewpoint 804 by a vector $(T_x, T_y, T_z)$, angular coordinates $(\varphi',\theta')$ are found for the point 802 with respect to the virtual viewpoint 806. The displacement vector $(T_x, T_y, T_z)$ may be determined based on viewpoint positions signaled in a container file, a manifest, a timed-metadata track, or otherwise.

Various techniques may be used to generate virtual viewpoint in different embodiments. Virtual viewpoint frames synthesized from different reference viewpoints may then be merged together using a blending process to generate the final equirectangular frame at the virtual viewpoint. Holes appearing the final frame due to occlusions at the reference viewpoint may be processed using an inpainting and hole filling step.

A virtual viewpoint is a non-captured viewpoint. Viewports can be rendered at a virtual viewpoint using video data from other viewpoints and/or other supplementary information. In some embodiments, the information used to render the scene from a virtual viewpoint is signaled in an OMAFVirtualViewpointConfigBox that is present in the OMAFViewpointInfoBox when the virtual_viewpoint flag is set. In some embodiments, the OMAFirtualViewpointConfigBox may be defined as follows.

| | |
|---|---|
| Box Type: | 'vvpc' |
| Container: | OMAFViewpointInfoBox |
| Mandatory: | No |
| Quantity: | Zero or more |

```
aligned(8) class OMAFVirtualViewpointConfigBox extends Box('vvpc') {
   unsigned int(5) synthesis_method;
   unsigned int(3) num_reference_viewpoints;
   unsigned int(16) reference_viewpoints[ ];
   // optional boxes but no fields
}
```

Examples of semantics for the OMAFVirtualViewpointConfigBox fields are given below.

synthesis_method indicates which synthesis method is used to generate the virtual viewpoint. The value of synthesis_method may be an index to a listed table of view synthesis methods. For example: depth-image-based rendering, image-warping-based synthesis, etc.

num_reference_viewpoints indicates the number of viewpoints that will be used as references in the synthesis of the virtual viewpoint.

reference_viewpoints is a list of the viewpoint ids which are used as references when synthesizing a viewport for this viewpoint.

In another embodiment, the identifiers of the tracks containing information needed for the synthesis process are directly signalled in a virtual viewpoint configuration box, which may be implemented as follows.

```
aligned(8) class OMAFVirtualViewpointConfigBox extends Box('vvpc') {
   unsigned int(5) synthesis_method;
   unsigned int(3) num_reference_tracks;
   unsigned int(16) reference_track_ids[ ];
   // optional boxes but no fields
}
```

An example of semantics of the OMAFVirtualViewpointConfigBox fields for this embodiment is as follows.
   synthesis_method indicates which synthesis method is used to generate the virtual viewpoint. The value of synthesis_method is the index to a listed table of view synthesis methods. For example: depth-image-based rendering, image-warping-based synthesis, etc.
   num_reference_tracks indicates the number of tracks within the container file that will be used as references in the synthesis of the virtual viewpoint.
   reference_track_ids is a list of track identifiers for the tracks used in the synthesis of viewports for this viewpoint.

Signaling Viewpoint Groups.

In large-scale events such as the FIFA World Cup, a number of events may be running in parallel at different venues or locations. For example, a number of games may take place in different stadiums, possibly in different cities. In some embodiments, viewpoints can be grouped based on the geolocation of the event/venue. In some embodiments, a ViewpointGroupStruct structure is used to store information about a group of viewpoints within the media container file. An example of syntax of this structure is as follows.

```
aligned(8) class ViewpointGroupStruct( ) {
   unsigned int(8) viewpoint_group_id;
   signed int(32) longitude;
   signed int(32) latitude;
   unsigned int(8) num_viewpoints;
   unsigned int(16) viewpoint_ids[ ];
   string viewpoint_group_name;
}
```

An example of semantics of the fields of ViewpointGroupStruct is as follows.
   viewpoint_group_id is a unique id that identifies the viewpoint group.
   longitude is the longitude coordinate of the geolocation of the event/venue where the viewpoints are located.
   latitude is the latitude coordinate of the geolocation of the event/venue where the viewpoints are located.
   num_viewpoints is the number of viewpoints within the viewpoint group.
   viewpoint_ids is an array with the ids of the viewpoints that are part of the viewpoint group.
   viewpoint_group_name is a string with a name describing the group.

To signal the available viewpoint groups within the media container file, an OMAFViewpointGroupsBox may be added to the MetaBox in the ISO BMFF container file. An example of the syntax of an OMAFViewpointGroups Box is given below.

| Box Type:   | 'ovpg'      |
|-------------|-------------|
| Container:  | MetaBox     |
| Mandatory:  | No          |
| Quantity:   | Zero or one |

```
aligned(8) class OMAFViewpointGroupsBox extends Box('ovpg') {
   unsigned int(8) num_viewpoint_groups;
   ViewpointGroupStruct viewpoint_groups[ ];
}
```

An example of semantics for fields of this box is follows:
   num_viewpoint_groups is the number of viewpoint groups.
   viewpoint_groups is an array of ViewpointGroupStruct instances, providing information about each viewpoint group.

For transport-protocol-level signaling (e.g. DASH), to signal the viewpoint groups available in a media presentation, an ovg element may be defined and signaled in the OVL descriptor described above. The OVL descriptor may contain one or more ovg elements. An ovg element has an @id attribute with a value representing a unique viewpoint group identifier and other attributes that describe the group. Table 3 lists attributes of an example of an ovg element.

TABLE 3

Semantics of the attributes of an example omaf:ovg element.

| Elements and attributes for OVL descriptor | Use | Data type | Description |
|---|---|---|---|
| @id | M | xs:string | Container element whose attributes and elements specify the characteristics of a viewpoint. |
| @name | O | xs:string | A name for the group. |
| @longitude | M | xs:double | The longitude of the geolocation of the event/venue at which the viewpoint group is located, measured in degrees. |
| @latitude | M | xs:double | The latitude of the geolocation of the event/venue at which the viewpoint group is located, measured in degrees. |
| @viewpointIds | M | xs:string | A comma-separated list of the identifiers of the viewpoints that belong to the group. |

Signaling Viewpoint Transition Effects.

Disclosed herein are the following examples of types of transitions: basic transitions, viewpoint path transitions, and auxiliary information transitions. Basic transitions are predefined transitions that can be used when switching from one viewpoint to another. An example of such a transition is the fade-to-black transition, where the rendered view gradually fades out to black then fades in to a frame from the new viewpoint. A viewpoint path transition enables content producers to specify a path that the player may follow across other viewpoints when switching to the target viewpoint. Auxiliary information transitions are transitions which rely on auxiliary information that the content producer provides in separate tracks. For example, an auxiliary track may contain depth information which can be used to render intermediate virtual views as the viewport moves from the first viewpoint to the target viewpoint.

In some embodiments, transitions may be based on the rendering of intermediate virtual views. This can be done using a view synthesis process such as depth-image-based rendering (DIBR), described for example in C. Fehn, "Depth-image-based rendering (DIBR), compression, and transmission for a new approach on 3D-TV," in SPIE Stereoscopic Displays and Virtual Reality Systems XI, vol. 5291, May 2004, pp. 93-104. DIBR uses depth information to project the pixels in a 2D plane to their position in 3D space and re-project them back to another plane. Since no capturing devices (e.g., no 360-degree cameras) are present at these intermediate viewpoints, they are referred to herein as virtual viewpoints. The number of intermediate virtual viewpoints rendered between the source and destination viewpoints determines the smoothness of the transition and depends on the capabilities of the player/device and the availability of auxiliary information for these intermediate viewpoints.

Figure 7:
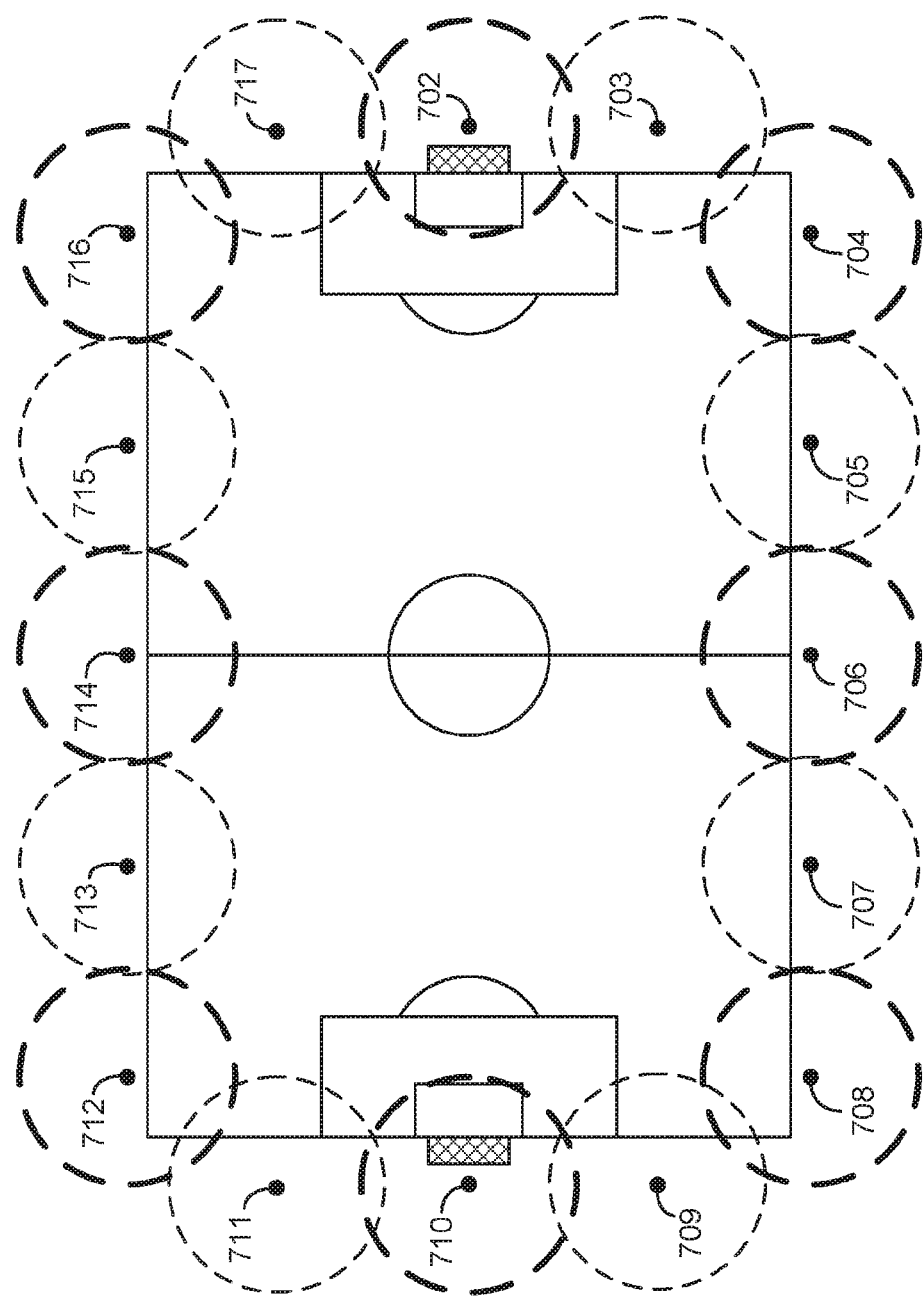
FIG. 7 illustrates an example of real viewpoints and intermediate virtual viewpoints.

FIG. 7 illustrates an embodiment using virtual viewpoints. In the example of FIG. 7, only viewpoints 702, 704, 706, 708, 710, 712, 714, 716 are viewpoints with capturing devices and the remaining intermediate viewpoints (703, 705, 707, 709, 711, 713, 715, 717) are virtual viewpoints. Other types of auxiliary information include: point cloud streams, additional reference frames from nearby viewpoints (to enhance the quality of virtual views), and occlusion information (to support the hole-filling step in the view synthesis process and improve the quality of the resulting virtual view at intermediate viewpoints). In some embodiments, point cloud streams are used to enable rendering virtual views at arbitrary viewpoint positions between the source and destination viewpoints. In some embodiments, point clouds are rendered using techniques described in Paul Rosenthal, Lars Linsen, "Image-space point cloud rendering", in Proceedings of Computer Graphics International, pp. 136-143, 2008.

Media Container-Level Signaling of Viewpoint Transition Effects.

Some embodiments operate to signal transition effects between pairs of viewpoints in the container file as a list of boxes in a new OMAFViewpointTransitionEffectListBox which can be placed in the Meta Box at the file level. In some embodiments, at most one instance of this box is present in the MetaBox. Boxes in OMAFViewpointTransitionEffectListBox are instances of OMAFViewpointTransitionBox. An example of syntax of the two boxes is given below.

Box Type:     'vptl'
Container:    MetaBox
Mandatory:    No
Quantity:     Zero or one
aligned(8) class OMAFViewpointTransitionEffectListBox extends Box('vptl') {
    OMAFViewpointTransitionBox transitions[ ];
}
Box Type:     'vpte'
Container:    OMAFViewpointTransitionEffectListBox
Mandatory:    No
Quantity:     One or more -continued aligned(8) class OMAFViewpointTransitionEffectBox extends Box('vpte')
{
    unsigned int(16) src_viewpoint_id;   // mandatory
    unsigned int(16) dst_viewpoint_id;   // mandatory
    unsigned int(8) transition_type;     // mandatory
    // additional box to specify the parameters of the transition
}

An example of semantics for the fields of OMAFViewpointTransitionBox is as follows:
  src_viewpoint_id is the id of the source viewpoint.
  dst_viewpoint_id is the id of the destination viewpoint.
  transition_type is an integer identifying the type of transition. Value 0 indicates a basic transition. Value 1 indicates a viewpoint path transition. Value 2 indicates an auxiliary information transition. Remaining values are reserved for future transitions.

In some embodiments, additional boxes related to the specific type of transition and providing additional information may be present in the OMAFViewpointTransitionBox. An additional box may be defined for each of the previously defined transitions types. An OMAFBasicViewpointTransitionBox is present if the transition_type field of an OMAFViewpointTransitionBox is equal to 0. This box contains only one field, basic_transition_type, whose value indicates a specific transition from a set of pre-defined basic transitions. A OMAFPathViewpointTransitionBox is present when the transition_type field of OMAFViewpointTransitionBox is equal to 1. This box contains a list of viewpoint identifiers which the player can follow when the user requests a transition to the target viewpoint. In some embodiments, a field may also be provided to indicate the speed of the transition along the path. A OMAFAuxiliaryInfoViewpointTransitionBox is present when the transition_type field of OMAFViewpointTransitionBox is equal to 2. This box contains two fields: a type field specifying the nature of the transition (e.g., generating virtual viewpoints), and an aux_track_id providing a reference to one of the tracks in the file which includes timed auxiliary information used to perform the transition effect. Examples of the syntax of the three aforementioned boxes are given below.

aligned(8) class OMAFBasicViewpointTransitionBox extends Box('vptb') {
    unsigned int(8) basic_transition_type;
{
aligned(8) class OMAFPathViewpointTransitionBox extends Box('vptp') {
    unsigned int(16) intermediate_viewpoints[ ];
}
aligned(8) class OMAFAuxiliaryInfoViewpointTransitionBox extends Box('vpta')
{
    unsigned int(8) type;
    unsigned int(32) aux_track_id;
}

Transport Protocol-Level Signaling (e.g. DASH) of Viewpoint Transition Effects.

Viewpoint transition effect information signaled at the container-level may also be signaled at the transport protocol level in the manifest file. If the container file contains viewpoint transition effect information, this information preferably matches the information signaled in the manifest file. In some embodiments, viewpoint transition effects are signaled within an OVL descriptor such as that described above. A transition effect between a viewpoint pair may be signaled by an ovp:transition element. In one example, this element has three attributes: @src, @dst, and @type. These attributes designate the id of the source viewpoint, the id of the destination viewpoint, and the type of the transition effect, respectively. For certain types of transition effects, the ovp:transition element may contain child elements providing additional information used by the client to render these transitions.

Table 4 lists examples of elements and attributes that may be used for signaling viewpoint transition effects in the MPD file.

TABLE 4

Semantics of elements and attributes of an example ovp:transition element.

| Elements and attributes for ovp:transition | Use | Data type | Description |
| --- | --- | --- | --- |
| ovp:transition@src | M | xs:string | The identifier for the source viewpoint. |
| ovp:transition@dst | M | xs:string | The identifier for the destination viewpoint. |
| ovp:transition@type | M | xs:unsignedByte | Indicates the type of the transition. Value 0 indicates a basic transition. Value 1 indicates a path transition. Value 2 indicates an auxiliary information transition. Other values are reserved. |
| ovp:transition:basic | CM | xs:vpBasicTransitionType | This element shall only be present if ovp:transition@type attribute is set to 0. |
| ovp:transition:basic @type | M | xs:unsignedByte | Indicates the type of the basic transition effect. |
| ovp:transition:path | CM | xs:vpPathTransitionType | Provides additional information about the path transition effect. This element shall only be present if ovp:transition@type attribute is set to 1. |
| ovp:transition:path @viewpoints | M | xs:string | A comma separated list of the identifiers of viewpoints along the path from the source viewpoint to the destination viewpoint. |
| ovp:transition:aux | CM | xs:vpAuxTransitionType | Provides additional information about the auxiliary information transition effect. This element shall only be present if ovp:transition@type attribute is set to 2. |
| ovp:transition:aux @auxIdList | M | xs:string | A comma-separated list of the ids of auxiliary information AdaptationSet elements. |

Signaling Recommended Projection Format for FoV.

Different projection formats may advantageous within different FoV ranges. For example, a rectilinear projection format may work well at a field of view of 90°, but an undesirable stretching effect may be visible using rectilinear projection at larger fields of view, such as 130°. Conversely, projection formats such as a "little planet" stereographic projection or a fisheye projection format may not work well at a FoV of 90° but may present a reasonable rendering experience at a higher FoV degree.

In some embodiments, to signal the recommended projection format for a range of device field of view (FoV) values, a OMAFRecommendedProjectionListBox is provided as additional metadata information in the 'meta' box. This box contains one or more OMAFRecommendedProjectionBox instances. An OMAFRecommendedProjectionBox defines horizontal and vertical FoV ranges and provides a recommended projection type for the specified FOV ranges. A player or streaming client which receives this signaling may determine the size of the field of view of the device on which the player or streaming client is running (e.g. it may look up the device's FOV capabilities from a local database, or it may obtain this property through an API call to the operating system of the HMD). The player or streaming client may compare this determined field of view size to the FOV ranges defined in the OMAFRecommendedProjectionBoxes in order to determine which of the recommended projection types corresponds to the field of view of the device. The player or streaming client may then request content in the determined recommended projection format. Examples of the syntax for these boxes are provided below.

```
Box Type:    'orpl'
Container:   MetaBox
Mandatory:   No
Quantity:    Zero or one
aligned(8) class OMAFRecommendedProjectionListBox extends
Box('orpl')
{
  OMAFRecommendedProjectionBox recommendations[ ];
}
```

-continued

```
Box Type:    'orpr'
Container:   OMAFRecommendedProjectionListBox
Mandatory:   No
Quantity:    One or more
aligned(8) class OMAFRecommendedProjectionBox extends Box('orpr') {
  bit(3) reserved = 0;
  unsigned int(5) projection_type;
  unsigned int(32) min_hor_fov;
  unsigned int(32) min_ver_fov;
  unsigned int(32) max_hor_fov;
  unsigned int(32) max_ver_fov;
}
```

Examples of semantics of the fields OMAFRecommendedProjectionBox are as follows:

projection_type indicates the type of the mapping of the projected picture onto the spherical coordinate system as specified by the OMAF standard. The value of projection_type may be the index of a list of rendering projection methods including rectilinear projection, little planet projection, equidistant projection, fisheye projection, etc.

min_hor_fov and min_ver_fov provide a minimum horizontal and vertical display field of view, in units of $2^{-16}$ degrees. min_hor_fov may be in the range of 0 to $360*2^{16}$, inclusive. min_ver_fov may be in the range of 0 to $180*2^{16}$, inclusive.

max_hor_fov and max_ver_fov provide a maximum horizontal and vertical display field of view, in units of $2^{-16}$ degrees. max_hor_fov may be in the range of 0 to $360*2^{16}$, inclusive. max_ver_fov may be in the range of 0 to $180*2^{16}$, inclusive.

In a case in which the projection format is recommended for a specific FoV, min_hor_fov is equal to max_hor_fov and min_ver_fov is equal to max_ver_fov.

In another embodiment, the content author or content provider may provide information identifying a recommended viewport for the devices with different FoV configurations with the suitable projection recommendation. Different devices with different FoVs may follow the recommended viewport and use the recommended projection format to render the 360 video content.

OMAF describes a recommended viewport information box (RcvpInfoBox) as follows.

```
class RcvpInfoBox extends FullBox('rvif', 0, 0) {
  unsigned int(8) viewport_type;
  string viewport_description;
}
```

The viewport_type specifies the type of the recommended viewport as listed in Table 5.

TABLE 5

Recommended viewport type.

| Value | Description |
|---|---|
| 0 | A recommended viewport suggested according to the creative intent of the content author or content provider (e.g. the "director's cut) |
| 1 | A recommended viewport selected based on measurements of viewing statistics |
| 2 ... 239 | Reserved (for use by future extensions of ISO/IEC 23090-2) |
| 240 ... 255 | Unspecified (for use by applications or external specifications) |

In some embodiments, an additional type of recommended viewport (which may be assigned, e.g., type 2) is used based on the FOV of the rendering devices. In some embodiments, the viewport_description of RcvpInfoBox may be used to indicate the recommended rendering projection method and the corresponding rendering FOV range. In some embodiments, an optional box is added in a RcvpInfoBox based on the viewport_type to indicate the additional parameters used for the corresponding recommended type. For example, OMAFRecommendedProjectionBox may be signaled when the viewport type is associated with the FOV.

```
class RcvpInfoBox extends FullBox('rvif', 0, 0) {
  unsigned int(8) viewport_type;
  string viewport_description;
  Box[ ] other_boxes; // optional
}
```

In another embodiment, a recommended viewport may accommodate multiple recommended types, or sub-types to offer user flexible selection. For example, the viewing statistics may be further divided into the statistics by the measuring period (e.g. weekly, monthly), the geography (countries, cities) or ages (youth, adult). Table 6 illustrates a hierarchical recommendation structure that may be used in some embodiments.

TABLE 6

| Director's Cut | 2D Rendering | |
| | | General |
| | | PG-13 |
| | | R |
| | | NC-17 |
| | VR Rendering | |
| | | General |
| | | PG-13 |
| | | R |
| | | NC-17 |
| Statistics | Time Period | |
| | | Today |
| | | Week |
| | | Month |
| | | Year |
| | Geographic | |
| | | North America |
| | | South America |
| | | Asia |
| | | Europe |

A recursive RcvpInfoBox structure is used in some embodiments to support a hierarchical recommendation structure. The other_boxes field proposed in a RcvpInfoBox structure may include RcvpInfoBox to specify the sub type as follows.

```
class RcvpInfoBox extends FullBox('rvif', 0, 0) {
  unsigned int(8) viewport_type;
  string viewport_description;
  RcvpinfoBox( ); // optional;
}
```

A single directors cut recommended viewport may offer multiple tracks, and each may support one or more recommended rendering projection methods for a FOV range. A RcvpInfoBox example structure is illustrated below. The value of viewport_type of the primary RcvpInfoBox is 0 indicating such recommended viewport is per director's cut, and the value of viewport_type (e.g. 1) in the secondary RcvpInfoBox may indicate the track associated with this director's cut recommended viewport is recommended for the device with particular rendering FOV. One or more instances of OMAFRecommendedProjectionBox may be signaled to provide recommended projection method(s) for the corresponding FOV range.

```
RcvpInfoBox{
  viewport_type = 0;   // recommended director's cut
  RcvpInfoBox {
    Viewport_type = 1; // recommeded for device FOV
    OMAFRecommendedProjectionBox( );  // projection method 1
    OMAFRecommendedProjectionBox( );  // projection method 2
    viewport_description;
  }
  viewport_description;
}
```

In a DASH MPD, the SupplementalProperty and/or EssentialProperty descriptors with @schemeIdUri equal to "urn:mpeg:dash:crd" may be used to provide a content recommendation description (CRD). The @value of the SupplementalProperty or EssentialProperty elements using the CRD scheme may be implemented as a comma separated list of values for CRD parameters as shown in Table 7.

TABLE 7

EssentialProperty@value and/or SupplementalProperty@value attributes for an example CRD scheme.

| EssentialProperty@value or SupplementalProperty@value parameter | Use | Description |
| --- | --- | --- |
| recommendation_type | M | Non-negative integer in decimal representation providing the primary recommendation type such as director's cut or statistic measurement. |
| sub_type | O | A comma separated list of non-negative integer in decimal representation expressing the hierarchical sub-type of the recommendations. For director's cut recommendation type, the sub-type can be the film rating type, or rendering device capabilities (e.g. 2D display, VR display, or stereoscopic display). Multiple sub-types can be listed in a comma separated list to indicate hierarchical sub-type structure. When not present, the Representation associated to this descriptor does not have a sub-type. |
| content_desciption | O | String representation providing additional recommendation information. For example, the recommended FOV range or preferred projection method may be included here for the director's cut recommendation for VR display so that the end user can identify the appropriate Object associated to this descriptor. |

XML Schema for DASH Signaling.

An example of an XML schema for DASH signaling that may be used in some embodiments is the following:

```
<?xml version="1.0" encoding="UTF-8"?>
<xs:schema xmlns:xs="http://www.w3.org/2001/XMLSchema"
  targetNamespace="urn:mpeg:mpegI:omaf:2017"
  xmlns:omaf="urn:mpeg:mpegI:omaf:2017"
  elementFormDefault="qualified"?
  <xs:element name="ovp" type="omaf:viewpointType"/>
  <xs:element name="ovg" type="omaf:viewpointGroupType"/>
  <xs:complexType name="viewpointType"?
    <xs:attribute name="id" type="xs:string" use="required" />
    <xs:attribute name="effective_range" type="xs:unsignedInt" use="optional" />
    <xs:attribute name="virtual" type="xs:boolean" use="optional" de-fault="-false" />
    <xs:attribute name="synthesisMethod" type="xs:unsignedByte" use="optional" />
    <xs:attribute name="refViewpointIds" type="xs:boolean" use="optional" />
    <xs:attribute name="dynamicPosition" type="xs:boolean" use="optional" default="false"
/>
    <xs:element name="position" type="omaf:viewpointPositionType" minOccurs="0"
maxOccurs="1"/>
    <xs:element name="availability" type="omaf:viewpointAvailabilityType"
maxOccurs="unbounded" />
    <xs:element name="transition" type="omaf:vpTransitionType" minOccurs="0"
maxOccurs="unbounded" />
  </xs:complexType>
  <xs:complexType name="viewpointPositionType">
    <xs:element name="global" type="omaf:viewpointGlobalPositionType" maxOccurs="1" />
    <xs:element name="cartesian" type="omaf:viewpointCartesianPositionType" maxOccurs="1"
/>
  </xs:complexType>
  <xs:complexType name="viewpointGlobalPositionType" use="optional" maxOccurs="1">
    <xs:attribute name="longitude" type="xs:double" use="required" />
    <xs:attribute name="latitude" type="xs:double" use="required" />
    <xs:attribute name="altitude" type="xs:double" use="optional" default="0" />
  </xs:complexType>
  <xs:complexType name="viewpointCartesianPositionType" use="optional" maxOccurs="1">
    <xs:attribute name="x" type="xs:int" use="required" />
    <xs:attribute name="y" type="xs:int" use="required" />
    <xs:attribute name="z" type="xs:int" use="optional" default="0" />
  </xs:complexType>
  <xs:complexType name="viewpointAvailabilityType" use="optional" maxOccurs="unbounded">
    <xs:attribute name="start" type="xs:unsignedLong" use="required" />
    <xs:attribute name="end" type="xs:unsignedLong" use="optional" />
  </xs:complexType>
  <xs:complexType name="vpTransitionType" use="optional" maxOccurs="unbounded">
    <xs:attribute name="src" type="xs:string" use="required" />
    <xs:attribute name="dst" type="xs:string" use="required" />
    <xs:attribute name="type" type="xs:unsignedByte" use="required" />
    <xs:element name="omaf:vpBasicTransitionType" use="optional" maxOccurs="1" />
    <xs:element name="omaf:vpPathTransitionType" use="optional" maxOccurs="1" />
    <xs:element name="omaf:vpAuxTransitionType" use="optional" maxOccurs="1" />
  </xs:complexType>
  <xs:complexType name="vpBasicTransitionType">
```

```
    <xs:attribute name="type" type="unsignedByte" use="required" />
  </xs:complexType>
  <xs:complextType name="vpPathTransitionType">
    <xs:attribute name="viewpoints" type="xs:string" use="required" />
  </xs:complextType>
  <xs:complexType name="vpAuxTransitionType">
    <xs:attribute name="auxIdList" type="xs:string" use="required" />
  </xs:complexType>
  <xs:complexType name="viewpointGroupType">
    <xs:attribute name="id" type="xs:string" use="required" />
    <xs:attribute name="name" type="xs:string" use="optional" />
    <xs:attribute name="longitude" type="xs:double" use="required" />
    <xs:attribute name="latitude" type="xs:double" use="required" />
    <xs:attribute name="viewpointIds" type="xs:string" use="required" />
  </xs:complexType>
</xs:schema>
```

Additional Embodiments.

In some embodiments, a method includes: receiving at least first 360-degree video data representing a view from a first viewpoint and second 360-degree video data representing a view from a second viewpoint; and generating a container file (e.g. an ISO Base Media File Format file) for at least the first video data and the second video data. In the container file: the first video data is organized into a first set of tracks and the second video data is organized in a second set of tracks; each of the tracks in the first set of tracks includes a first track-group identifier associated with the first viewpoint; and each of the tracks in the second set of tracks includes a second track-group identifier associated with the second viewpoint.

In some such embodiments, each of the tracks in the first set of tracks includes a respective instance of a viewpoint-group-type box that contains the first track-group identifier; and each of the tracks in the second set of tracks includes a respective instance of a viewpoint-group-type box that contains the second track-group identifier.

In some embodiments where the container file is organized in a hierarchical box structure, and the container file includes a viewpoint-list box that identifies at least a first viewpoint-information box and a second viewpoint-information box, the first viewpoint-information box includes at least (i) the first track-group identifier and (ii) an indication of time intervals for which video from the first viewpoint is available; and the second viewpoint-information box includes at least (i) the second track-group identifier and (ii) an indication of time intervals for which video from the second viewpoint is available. The indications of time intervals may be lists of instances of respective viewpoint availability interval boxes.

In some embodiments, where the container file is organized in a hierarchical box structure, and where the container file includes a viewpoint-list box identifying at least a first viewpoint-information box and a second viewpoint-information box: the first viewpoint-information box includes at least (i) the first track-group identifier and (ii) an indication of a position of the first viewpoint; and the second viewpoint-information box includes at least (i) the second track-group identifier and (ii) an indication of a position of the second viewpoint. The indication of position may include Cartesian coordinates or latitude and longitude coordinates.

In some embodiments where the container file is organized in a hierarchical box structure, and where the container file includes a viewpoint-list box identifying at least a first viewpoint-information box and a second viewpoint-information box: the first viewpoint-information box includes at least (i) the first track-group identifier and (ii) an indication of an effective range of the first viewpoint; and the second viewpoint-information box includes at least (i) the second track-group identifier and (ii) an indication of an effective range of the second viewpoint.

In some embodiments where the container file is organized in a hierarchical box structure, and the container file includes a transition-effect-list box identifying at least one transition-effect box, each transition-effect box includes: an identifier of a source viewpoint; an identifier of a destination viewpoint; and an identifier of a transition type. The identifier of the transition type may identify a basic transition or a viewpoint path transition. Where the identifier of the transition type identifies a path-viewpoint-transition box, the path-viewpoint-transition box may include a list of viewpoint identifiers. Where the identifier of the transition type identifies an auxiliary-information-viewpoint-transition box, the auxiliary-information-viewpoint-transition box may include a track identifier.

In some embodiments, where the container file is organized in a hierarchical box structure including a meta box: the meta box identifies at least one recommended-projection-list box; and each recommended-projection-list box includes information identifying (i) a projection type and (ii) a corresponding field-of-view range. The information identifying the corresponding field-of-view range may include: a minimum horizontal field of view angle; a maximum horizontal field of view angle; a minimum vertical field of view angle; and a maximum vertical field of view angle.

Some embodiments include a non-transitory computer storage medium storing a container file generated according to any of the methods described herein.

In some embodiments a method includes: receiving at least first 360-degree video data representing a view from a first viewpoint and second 360-degree video data representing a view from a second viewpoint; and generating a manifest, such as an MPEG-DASH MPD. In the manifest: at least one stream in a first set of streams is identified, each stream in the first set representing at least a portion of the first video data; at least one stream in a second set of streams is identified, each stream in the second set representing at least a portion of the second video data; each of the streams in the first set is associated in the manifest with a first viewpoint identifier and; each of the streams in the second set is associated in the manifest with a second viewpoint identifier.

In some such embodiments, each of the streams in the first set is associated in the manifest with a respective adaptation set that has the first viewpoint identifier as an attribute; and each of the streams in the second set is associated in the manifest with a respective adaptation set that has the second viewpoint identifier as an attribute. The attribute may be a @viewpoint_id attribute.

In some embodiments, each of the streams in the first set is associated in the manifest with a respective adaptation set that has the first viewpoint identifier in a first descriptor; and each of the streams in the second set is associated in the manifest with a respective adaptation set that has the second viewpoint identifier in a second descriptor. The first and second descriptors may be SupplementalProperty descriptors.

In some embodiments, the manifest includes an attribute indicating an effective range for each of the viewpoints. In some embodiments, the manifest includes an attribute indicating a position for each of the viewpoints. The attribute indicating position may include cartesian coordinates or latitude and longitude coordinates. In some embodiments, the manifest includes, for each viewpoint, information indicating at least one time period during which video for the respective viewpoint is available.

In some embodiments, the first video data and second video data are received in a container file (such as an ISO Base Media File Format file) in which: the first video data is organized into a first set of tracks and the second video data is organized in a second set of tracks; each of the tracks in the first set of tracks includes a first track-group identifier associated with the first viewpoint; and each of the tracks in the second set of tracks includes a second track-group identifier associated with the second viewpoint. The viewpoint identifiers used in the manifest are equal to the respective track-group identifiers in the container file.

In some embodiments, a method includes: receiving a manifest identifying a plurality of 360-degree video streams, the manifest including, for each identified stream, information identifying a viewpoint location of the respective stream; retrieving and displaying a first video stream identified in the manifest; and overlaying on the display of the first video stream a user interface element indicating the viewpoint location of a second video stream identified in the manifest. In some embodiments, the method includes, in response to selection of the user interface element, retrieving and displaying the second video stream.

In some embodiments, where the manifest further includes information identifying an effective range of at least one of the identified streams, the method further includes displaying an indication of the effective range. In some embodiments, where the manifest further includes information identifying a period of availability of the second video stream, the user interface element is displayed only during the period of availability.

In some embodiments, the manifest includes information identifying a transition type for a transition from the first video stream to the second video stream. In response to selection of the user interface element, the method includes: presenting a transition having the identified transition type; and retrieving and displaying the second video stream, the second video stream being displayed after the presentation of the transition.

In some embodiments, where the manifest further includes information identifying a location of at least one virtual viewpoint, the method further includes, in response to selection of the virtual viewpoint, synthesizing a view from the virtual viewpoint and displaying the synthesized view.

In some embodiments, a method includes: receiving a manifest (an MPEG-DASH MPD) identifying a plurality of 360-degree video streams, the manifest including information identifying a respective projection format of each of the video streams, the manifest further including information identifying a respective range of field-of-view sizes for each of the projection formats; determining a field-of-view size for display; selecting at least one of the video streams such that the determined field-of-view size is within the identified range of field-of-view sizes for the projection format of the selected video streams; and retrieving at least one of the selected video streams and displaying the retrieved video stream with the determined field-of-view size.

Further embodiments include a system comprising a processor and a non-transitory computer-readable medium storing instructions operative when executed on the processor to perform any of the methods described herein.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   receiving, from a server, a manifest including information identifying omnidirectional videos captured from respective viewpoints, the manifest includes information identifying a first omnidirectional video captured from a first viewpoint and a second omnidirectional video captured from a second viewpoint;
   receiving, from the server, information identifying transition effects associated with respective pairs of source and destination viewpoints, including receiving information identifying a first transition effect including one or more viewpoint identifiers associated with the first viewpoint as the source viewpoint and the second viewpoint as the destination viewpoint; and transitioning from the first omnidirectional video to the second omnidirectional video using one or more omnidirectional videos identified in the manifest and captured from respective viewpoints identified by the one or more viewpoint identifiers included in the first transition effect.

2. The method of claim 1, wherein the first transition effect is a fade-to-black effect.

3. The method of claim 1, wherein the information identifying the first transition effect identifies a speed of transition along a path across the viewpoints used for the transitioning from the first omnidirectional video to the second omnidirectional video.

4. The method of claim 1, further comprising receiving, for at least one of the first and second viewpoints, information identifying an effective range of the respective viewpoint.

5. The method of claim 1, wherein the information identifying the first transition effect identifies auxiliary information applied to render intermediate views used for the transitioning from the first viewpoint to the second viewpoint.

6. The method of claim 1, further comprising displaying to a user a user interface, wherein the user interface allows a user to select the second omnidirectional video based on the viewpoint position of the second omnidirectional video.

7. The method of claim 6, further comprising displaying the second omnidirectional video to the user in response to user selection of the second omnidirectional video.

8. The method of claim 6, wherein displaying the user interface comprises:
  displaying the first omnidirectional video to the user; and
  displaying an indication of the second omnidirectional video at a location in the first omnidirectional video corresponding to the second viewpoint of the second omnidirectional video.

9. The method of claim 8, wherein the indication of the second omnidirectional video has a size based on a distance from the first viewpoint to the second viewpoint.

10. The method of claim 1, further comprising, before the transitioning from the first omnidirectional video to the second omnidirectional video:
  causing display of the first omnidirectional video; and
  causing display of an icon at a location in the first omnidirectional video corresponding to the second viewpoint position of the second omnidirectional video, wherein the icon has a size based on a distance from the first viewpoint position to the second viewpoint position.

11. The method of claim 10, further comprising:
  in response to user selection of the icon, performing the transitioning from the first omnidirectional video to the second omnidirectional video.

12. The method of claim 10, wherein the size of the icon is smaller for greater distances between the first viewpoint position and the second viewpoint position to provide a depth effect for the second viewpoint position.

13. The method of claim 10, further comprising receiving, for at least one of the first and second viewpoints, information identifying an effective range of the respective viewpoint.

14. A system comprising a processor configured to perform at least:
  receiving, from a server, a manifest including information identifying omnidirectional videos captured from respective viewpoints, the manifest includes information identifying a first omnidirectional video captured from a first viewpoint and a second omnidirectional video captured from a second viewpoint;
  receiving, from the server, information identifying transition effects associated with respective pairs of source and destination viewpoints, including receiving information identifying a first transition effect including one or more viewpoint identifiers associated with the first viewpoint as the source viewpoint and the second viewpoint as the destination viewpoint; and
  transitioning from the first omnidirectional video to the second omnidirectional video using one or more omnidirectional videos identified in the manifest and captured from respective viewpoints identified by the one or more viewpoint identifiers included in the first transition effect.

15. The system of claim 14, wherein the first transition effect is a fade-to-black effect.

16. The system of claim 14, wherein the information identifying the first transition effect identifies a speed of transition along a path across the viewpoints used for the transitioning from the first omnidirectional video to the second omnidirectional video.

17. The system of claim 14, wherein the information identifying the first transition effect identifies auxiliary information applied to render intermediate views used for the transitioning from the first viewpoint to the second viewpoint.

18. The system of claim 14, further comprising displaying to a user a user interface, wherein the user interface allows a user to select the second omnidirectional video based on the viewpoint position of the second omnidirectional video.

19. The system of claim 18, further comprising displaying the second omnidirectional video to the user in response to user selection of the second omnidirectional video.

20. The system of claim 18, wherein displaying the user interface comprises:
  displaying the first omnidirectional video to the user; and
  displaying an indication of the second omnidirectional video at a location in the first omnidirectional video corresponding to the second viewpoint of the second omnidirectional video.

21. The system of claim 20, wherein the indication of the second omnidirectional video has a size based on a distance from the first viewpoint to the second viewpoint.

* * * * *